United States Patent [19]

Horikawa et al.

[11] Patent Number: 5,086,497
[45] Date of Patent: Feb. 4, 1992

[54] IMAGE OUTPUT COMMAND METHOD FOR IMAGE PROCESSING SYSTEM

[75] Inventors: Hiroshi Horikawa; Akira Watanabe; Hiroo Koyama; Ikuo Mori, all of Kaisei, Japan

[73] Assignee: Fuji Photo Film Co., Ltd., Kanagawa, Japan

[21] Appl. No.: 600,280

[22] Filed: Oct. 22, 1990

Related U.S. Application Data

[63] Continuation of Ser. No. 301,553, Jan. 26, 1989, abandoned.

[30] Foreign Application Priority Data

Jan. 27, 1988 [JP] Japan .................................. 63-16049
Jan. 27, 1988 [JP] Japan .................................. 63-16050

[51] Int. Cl.$^5$ .............................................. G06F 3/00
[52] U.S. Cl. ...................................... 395/147; 395/148
[58] Field of Search ............... 364/518, 521, 523, 200, 364/900; 354/5

[56] References Cited

U.S. PATENT DOCUMENTS 4,575,813 3/1986 Bartlett et al. .................. 364/523 X
4,587,633 5/1986 Wang et al. ..................... 364/521 X
4,594,674 6/1986 Boulia et al. ........................ 364/523
4,816,925 3/1989 Hayashi ............................... 364/521

Primary Examiner—Gary V. Harkcom
Assistant Examiner—Michael A. Jaffe
Attorney, Agent, or Firm—Sughrue, Mion, Zinn Macpeak & Seas

[57] ABSTRACT

An image output command method, in an image processing system comprising an input controller to dot and compress density or tone data for an image read out by an input unit and for temporarily staying the compressed image data at a buffer; a work station to picture-edit not only a code information edited by an editing input unit but also the image data by the use of an input operating means and a display means; a file server connected to the input controller and the work station by bus lines and for storing the image data, code information and edited data picture-edited by the work station in the file server; and an image setter for reading out the edited data stored in the file server and subjecting the edited data to a required data processing, which comprises the steps of: reading out the stored data from the file server, separating respective image data which constitute one page and commands which edit respective images when the images are transferred to the image output unit via the image setter and are outputted, and separating the data of a unit of one page to blocks and sub-blocks thereby to control image portions by output position and processing method.

9 Claims, 26 Drawing Sheets

FIG. 8
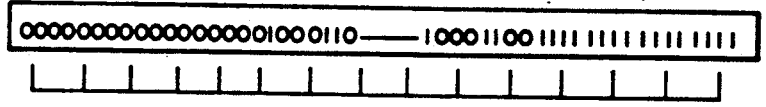
FIG. 10
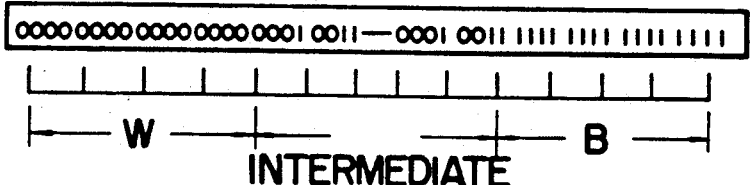
FIG. 11

| CODE FOR ENCODING (5 BITS) | BIT PATTERN OF CODE TABLE 0 | BIT PATTERN OF CODE TABLE 1 | BIT PATTERN OF CODE TABLE 2 | BIT PATTERN OF CODE TABLE 3 |
|---|---|---|---|---|
| 00000 | 00000000 | 00000000 | 00000000 | 00000000 |
| 00001 | 00000001 | 00000001 | 00000001 | 00000001 |
| 00010 | 00000011 | 00000011 | 00000011 | 00000011 |
| 00011 | 00000111 | 00000111 | 00000111 | 00000111 |
| 00100 | 00001111 | 00001111 | 00001111 | 00001111 |
| 00101 | 00010000 | 00010000 | 00010000 | 00010000 |
| 00110 | 00010001 | 00010001 | 00010001 | 00010001 |
| 00111 | 00010011 | 00010011 | 00010011 | 00010011 |
| 01000 | 00010111 | 00010111 | 00010111 | 00010111 |
| 01001 | 00011111 | 00011111 | 00011111 | 00011111 |
| 01010 | 00110000 | 00110000 | 00110000 | 00110000 |
| 01011 | 00110001 | 00110001 | 00110001 | 00110001 |
| 01100 | 00110011 | 00110011 | 00110011 | 00110011 |
| 01101 | 00110111 | 00110111 | 00110111 | 00110111 |
| 01110 | 00111111 | 00111111 | 00111111 | 00111111 |
| 01111 | 01110000 | 01110000 | 01110000 | 01110000 |
| 10000 | 01110001 | 01110001 | 01110001 | 01110001 |
| 10001 | 01110011 | 01110011 | 01110011 | 01110011 |
| 10010 | 01110111 | 01110111 | 01110111 | 01110111 |
| 10011 | 01111111 | 01111111 | 01111111 | 01111111 |
| 10100 | 11110000 | 11110000 | 11110000 | 11110000 |
| 10101 | 11110001 | 11110001 | 11110001 | 11110001 |
| 10110 | 11110011 | 11110011 | 11110011 | 11110011 |
| 10111 | 11110111 | 11110111 | 11110111 | 11110111 |
| 11000 | 11111111 | 11111111 | 11111111 | 11111111 |

FIG. 12

| CODE FOR ENCODING (5 BITS) | BIT PATTERN OF CODE TABLE 0 | BIT PATTERN OF CODE TABLE 1 | BIT PATTERN OF CODE TABLE 2 | BIT PATTERN OF CODE TABLE 3 |
|---|---|---|---|---|
| 11001 | Not Used | Not Used | 0000000000000000 | 0000000000000000 |
| 11010 | Not Used | Not Used | 0011001100110011 | 0011001100110011 |
| 11011 | Not Used | Not Used | 1111111111111111 | 1111111111111111 |
| 11100 (111 WHEN INDICATE "End") | Not Used | End (B SECTION BECOMES TO 3 BITS) | End (B SECTION BECOMES TO 3 BITS) | 0000111100001111 |
| 11101 (111 WHEN INDICATE "End") | Not Used | End (B SECTION BECOMES TO 3 BITS) | End (B SECTION BECOMES TO 3 BITS) | 0001000100010001 |
| 11110 (111 WHEN INDICATE "End") | Not Used | End (B SECTION BECOMES TO 3 BITS) | End (B SECTION BECOMES TO 3 BITS) | 0111011101110111 |
| 11111 (111 WHEN INDICATE "End") | Not Used | End (B SECTION BECOMES TO 3 BITS) | End (B SECTION BECOMES TO 3 BITS) | 1111000011110000 |

F I G. 13

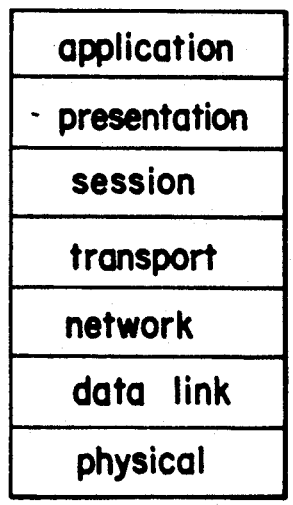

F I G. 14

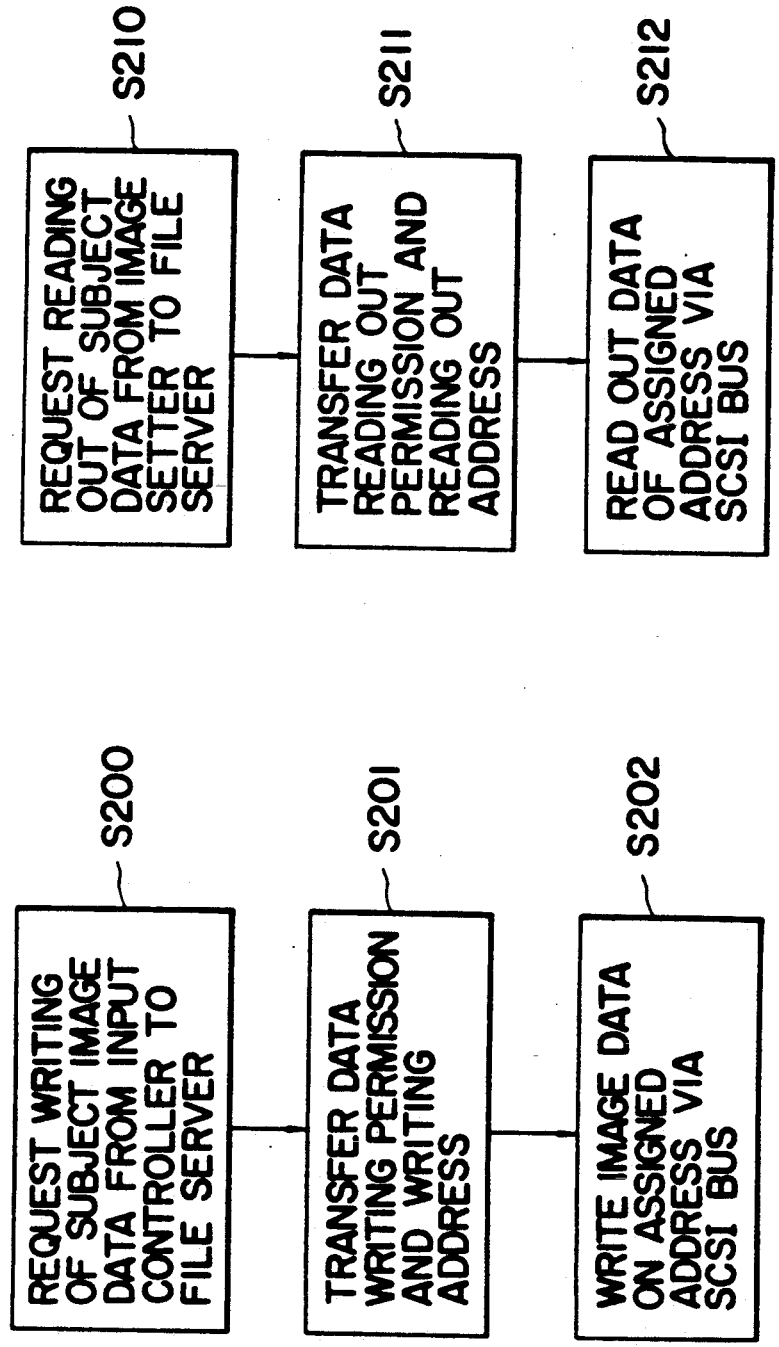

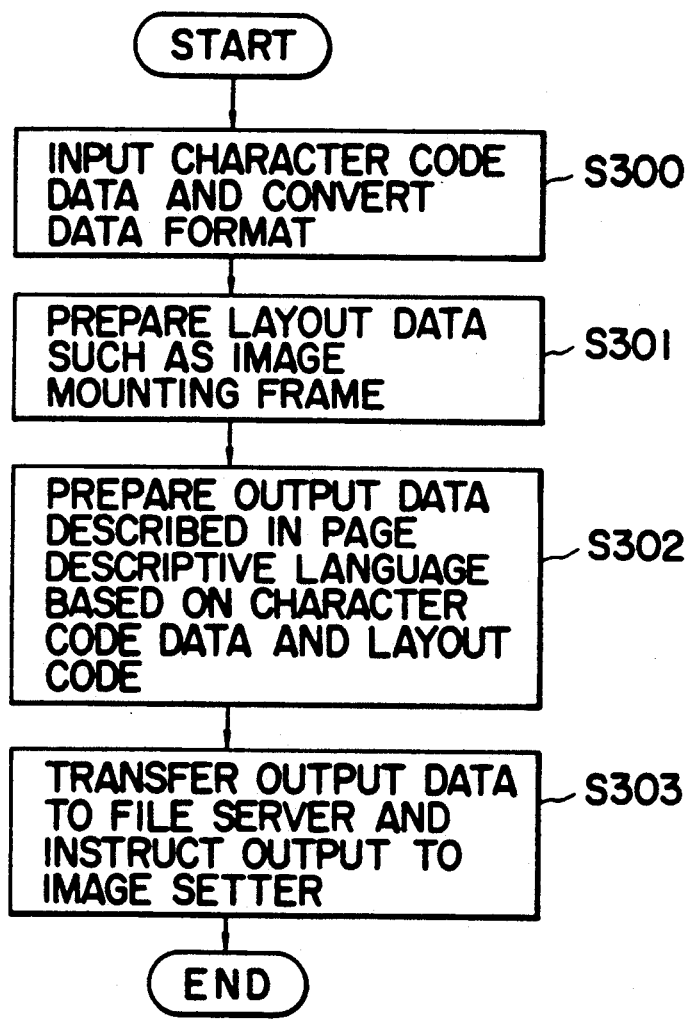
F I G. 17

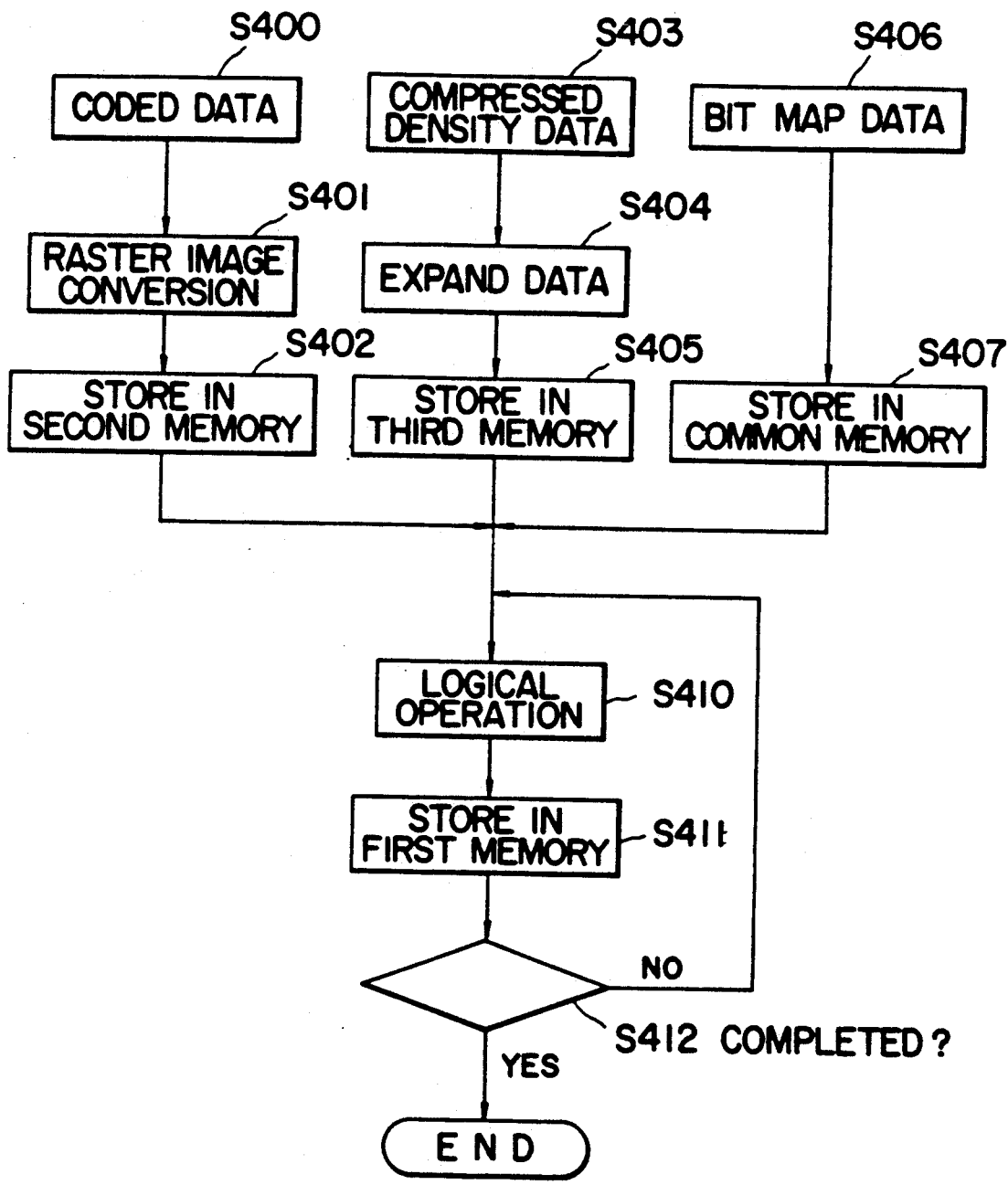
F I G. 23

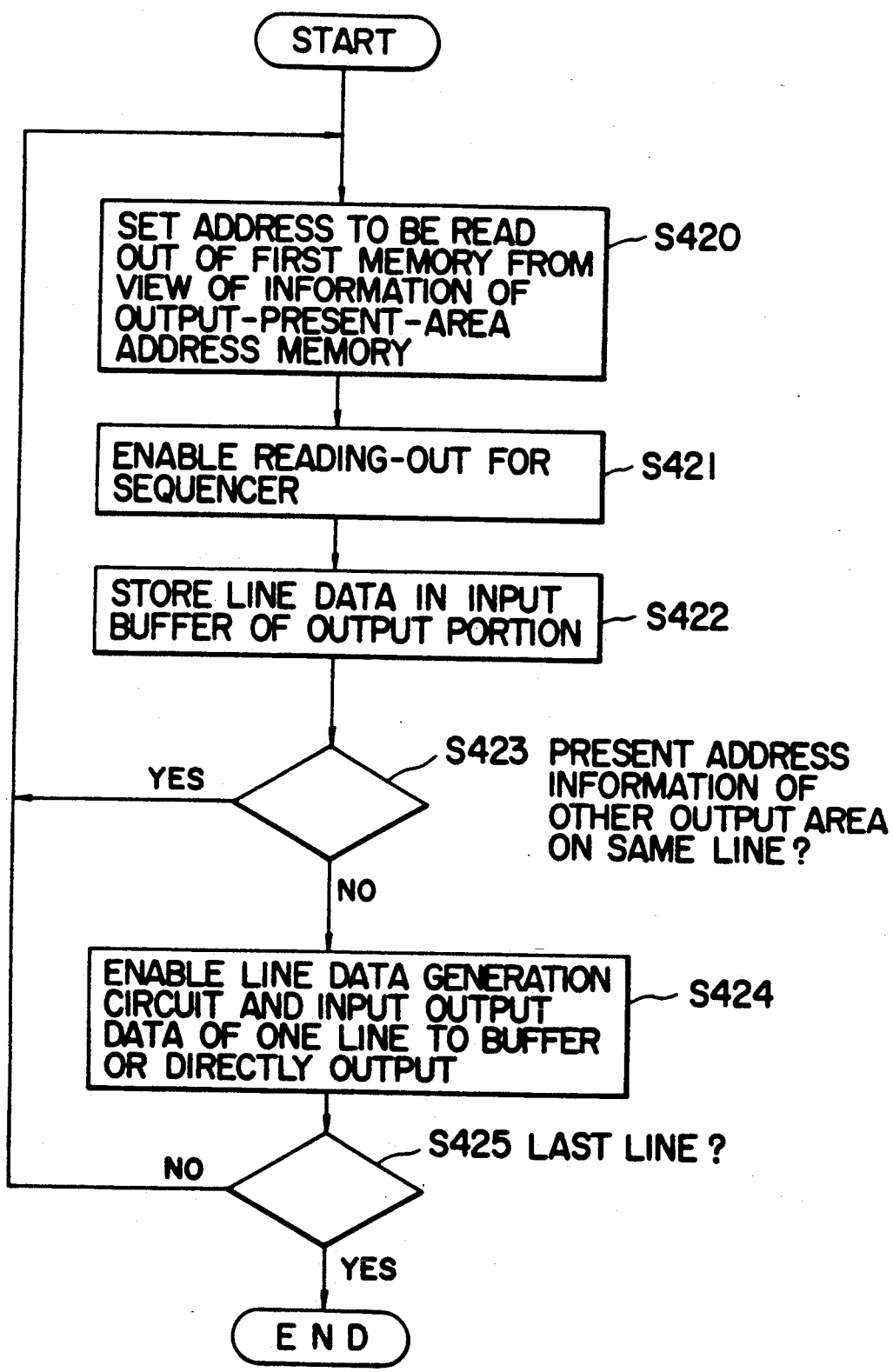
F I G. 25

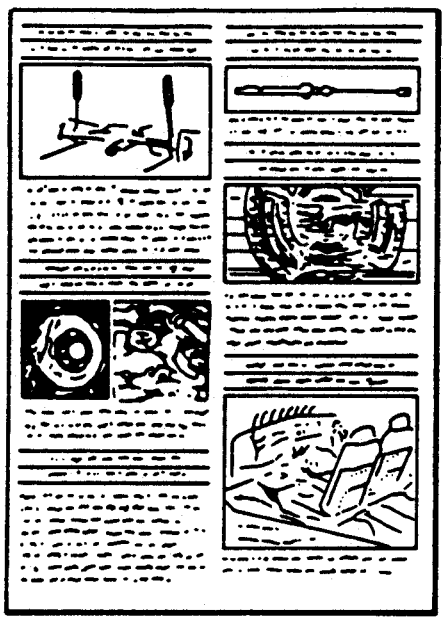
FIG. 27A
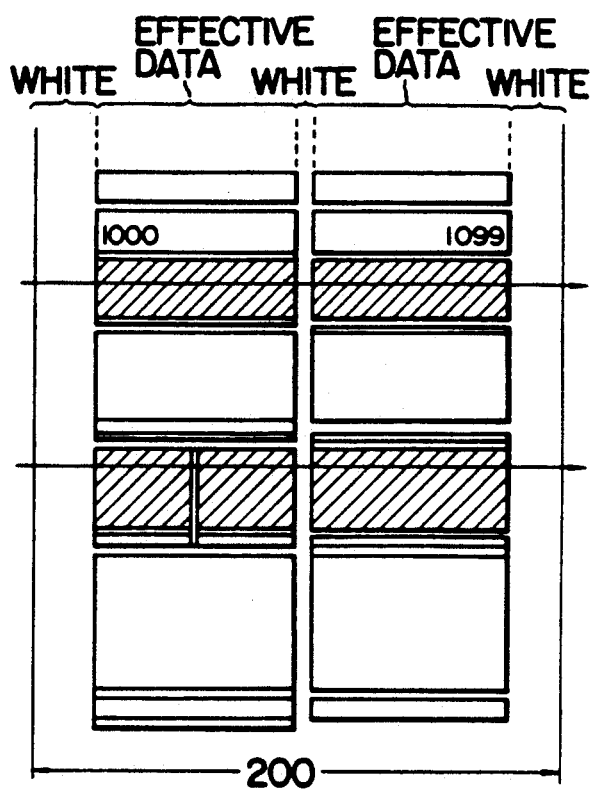
FIG. 27D
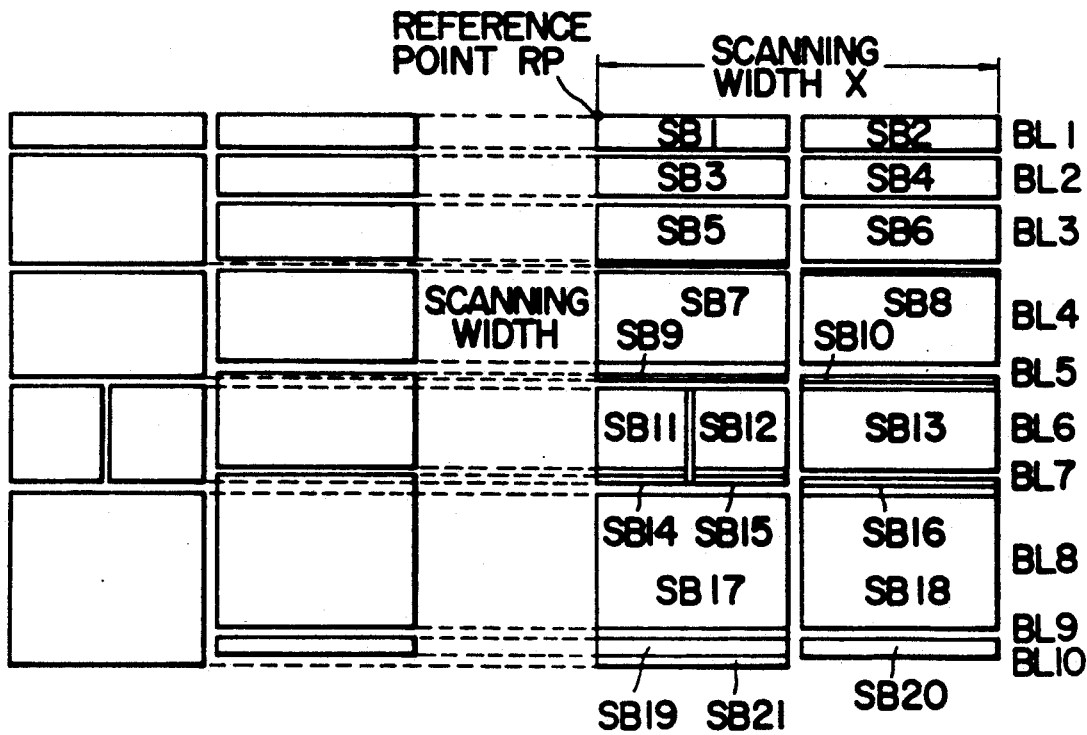
FIG. 27B
FIG. 27C

| HEADER OF OUTPUT PAGE |
|---|
| BLOCK HEADER #1 |
| SUB-BLOCK DATA SD1 |
| SUB-BLOCK DATA SD2 |
| BLOCK HEADER #2 |
| SUB-BLOCK DATA SD3 |
| SUB-BLOCK DATA SD4 |
| ⋮ |
| BLOCK HEADER #6 |
| SUB-BLOCK DATA SD11 |
| SUB-BLOCK DATA SD12 |
| SUB-BLOCK DATA SD13 |
| ⋮ |
| BLOCK HEADER #10 |
| SUB-BLOCK DATA SD21 |

FIG. 30

| |
|---|
| DATA AMOUNT OF OUTPUT PAGE |
| DESIGNATION OUTPUT PAGE NUMBER |
| NAME OF OUTPUT UNIT |
| PAGE NUMBER |
| REFERENCE POINT COORDINATE X |
| REFERENCE POINT COORDINATE Y |
| PAGE SIZE X |
| PAGE SIZE Y |
| WHOLE BLOCK NUMBER |
| BLOCK START OFFSET ADDRESS |
| REFERENCE NUMBER OF IMAGE NUMBER 1 |
| ⋮ |
| REFERENCE NUMBER OF IMAGE NUMBER n |

FIG. 31

IMAGE OUTPUT COMMAND METHOD FOR IMAGE PROCESSING SYSTEM

This is a continuation of application Ser. No. 07/301,553 filed Jan. 26, 1989 now abandoned.

BACKGROUND OF THE INVENTION

1. Field of the Invention

This invention relates to an image processing system which is adapted to electronically interactive-edit images such as characters, designs, and binary images to process and image-record the same as a block copy for printing, further relates to a sampling method for data which is improved in performance by sampling image data printing (density data) in a shorter time and reducing the time required for post-processing. Further, this invention relates to an image generating apparatus in the image processing system which outputs, by layouting, character images formed by code data and bit map images formed by compressed data or non-compressed data.

2. Description of the Prior Art

It is necessary to handle high quality images in a printing field, and it is necessary to process a great amount of image data at a high speed in order to handle the high quality images. It has been heretofore desirable to provide an image processing system for typographers who require high quality printed matter in which characters, designs or the like are consolidated as a whole for editing the same. Notwithstanding, such system has not been proposed but is less capable and practical in use even if it is available.

Particularly, among others, a desk top publishing art has been gradually realized in a manner of description such as a post script but is still less capable and efficient of an image art. Systems for the typographers have been of course, available but is insufficient in handling (input, display, storage, processing, edition, and output and the like) data in bulk and at a high speed. This is because that the characters and images to be synthetically processed are subjected to various approaches by a description language, and a central processing unit (CPU: software) to thus exhibit a poor performance. In the case of outputting only code data for manufacturing a block copy for printing, it is necessary to convert the code data to bit map data for each characters and further to in advance develop it to the bit map data every some rasters. In the case of outputting only the bit map data, the whole or a part of the output image is stored at a temporary buffer and then transferred to an output unit. However, in order to reduce the capacity of the above buffer, the output unit awaits during the time when the output image is stored at the buffer.

However, the apparatus described above cannot simultaneously output the layouted characters and pictures and has a defect that it needs much time to realize if the apparatus in advance layouts the character bit map in the buffer which outputs the bit map. Alternatively, the apparatus outputs the characters and the picture on the separate paper or photographic film, respectively, and an operator patches on the paper or the photographic film. Under these cituations, it takes much time due to the repetition works such as exposure or printing, and photosensitive materials intermediately produced are wasted.

FIG. 1 is a flow chart showing a typical manufacturing process of a conventional print plate for printing, which comprises steps of inputting code data (Step S40) prepared by a word processor and the like, checking a PPC output after a code conversion (Step S41) of the code as prepared and a composing editing (Step S42), and outputting characters from a computer aided photocomposer (hereinafter referred to as "photocomposer") (Steps S43 and S44). What is termed the composing editing is meant to refer to arrangement of a row of the characters according to a prescribed rule, more specifically a forbidden processing or the like. In general, the word processor used for an office automation or the like is designed so that full scale characters are disposed in order. In contrast, the art of photocomposing is contemplated to obtain high quality characters each of which is a half of the width of the full scale character. In this connection, it should be noted that the PPC output is a synonym for a laser beam printer (LBP). Generally, the output of the high quality image output unit is a black-and-white sensitized paper or film either of which is silver halide and expensive but functions at a speed lower than the LBP due to high resolving power. In contrast, the LBP is of less resolving power because of an electrophotographic system and is thus inexpensive but acts at a high speed. For this reason, the LBP is sufficient for checking and correcting layouts, characters or the like. The PPC output check is also meant to refer to confirmation of the characters or the like prior to the high quality image output without trial. The original for designs or the like is read out by a monotone scanner such as to output the image as screen dotted (Step S45). Computer aided and manual photocomposer character outputs, a line image, and an illustration and the like as well as such the screen dotted output are manually paste up (Step S50). A galley proof of its synthetic image is obtained to check its content and to correct it if necessary (Step S51 and S52). Then, the manual photocomposer output for paste-up is provided to finally check and correct the image (Step S54 and S55). These steps are followed by operations such as a camera work (Step S60), a page cutting (Step S61), a pinhole opaque (Step S62), and a film photo-composing (Step S63) for plate making. It is noted that disadvantages derived from the high quality image output unit are that the image outputted thereby to silver halide sensitive materials (such as a sensitive paper, a film or the like) is made white but not black or is turned adverse by a minute spot. These modifications and amendments are termed "pinhole amendments".

As seen from the foregoing, the conventional plate making process requires a great deal of operations such as repeated paste-up, photocomposing to involve much labor and time, thus considerably decreasing efficiency. In order to plate-make an output page as shown in (B) FIG. 2, it is necessary to store data of images #1–#4 and non-image portion (white or black) in output order as shown (C) in FIG. 2. Since the data of the non-image portion is also stored in a memory as described above, it is impossible to handle the high quality image and enormous capacity is required for the memory. In this connection, it has been described that the non-image portion has only the information on areas.

SUMMARY OF THE INVENTION

The invention is provided in view of the aforementioned circumstances.

It is an object of this invention to provide an image generating apparatus which outputs layouted data of character code data and bit map data or compressed image data at a high speed, in an image processing system which is most suitable for printing traders who electronically, interactively edit and process a great deal of image data at a high speed.

It is another object of this invention to provide a command method for efficiently outputting images at a high speed in the above image processing system.

According to one aspect of this invention, for achieving the objects described above, there is provided an image output command method, in an image processing system comprising an input controller to dot and compress density data for an image read out by an input unit and for temporarily staying said compressed image data at a buffer; a work station to picture-edit not only a code information edited by an editing input unit but also said image data by the use of an input operating means and a display means; a file server connected to said input controller and said work station by bus lines and for storing said image data, code information and edited data picture-edited by said work station in said file server; and an image setter for reading out said edited data stored in said file server and subjecting said edited data to a required data processing, which comprises the steps of: reading out the stored data from said file server, separating respective image data which constitute one page and commands which edit respective image when the image are transferred to said image output unit viasaid image setter and are outputted, separating the data of a unit of one page to blocks and sub-blocks thereby to control image portions by output position and processing method.

According to another aspect of this invention, there is provided an image generating apparatus to output by layouting character images formed by code data and bit map images formed by compressed data or non-compressed data, which comprises a first memory for storing image data for outputting, a raster image converter for converting said code data into bit map data, a second memory for temporarily storing output data of said raster image converter, an expander for converting said compressed data into bit map data by expanding said compressed data, a third memory for temporarily storing output data of said expander, a fourth memory for temporarily storing data by inputting bit map per se, a transferring means for transferring data from said second, third and fourth memories to a disignated area of said first memory, a logical operational means for performing a logical operation for each bit between said transferred data and said stored data of said first memory at a time when said data is transferred, and a sequencer makes said respective means operate in a predetermined order.

The nature, principle and utility of the invention will become more apparent from the following detailed description when read conjunction with the accompanying drawings.

BRIEF DESCRIPTION OF THE DRAWINGS

In the accompanying drawings:

FIGS. 7 through 13 are diagrams explaining the dotting and compression of the density data in accordance with this invention;

FIG. 14 is a diagram showing a TCP/IP protocol;

FIGS. 16A and 16B are flow charts showing operation examples of the file server according to this invention;

FIGS. 17 and 18 are flow charts showing action examples of the work station;

FIGS. 19A through 19I are diagrams explaining operational examples of the work station during editing process or the like;

FIG. 23 is a flow chart showing an operation example of the same image setter;

FIG. 25 is a flow chart showing an operational example of the image setter;

FIGS. 27A through 27D, FIGS. 28 and 29 are diagrams explaining the operation of the same preset counter; and FIGS. 30 and 31 are charts showing an example of the image output commands according to this invention.

DESCRIPTION OF THE PREFERRED EMBODIMENTS

Figure 1:
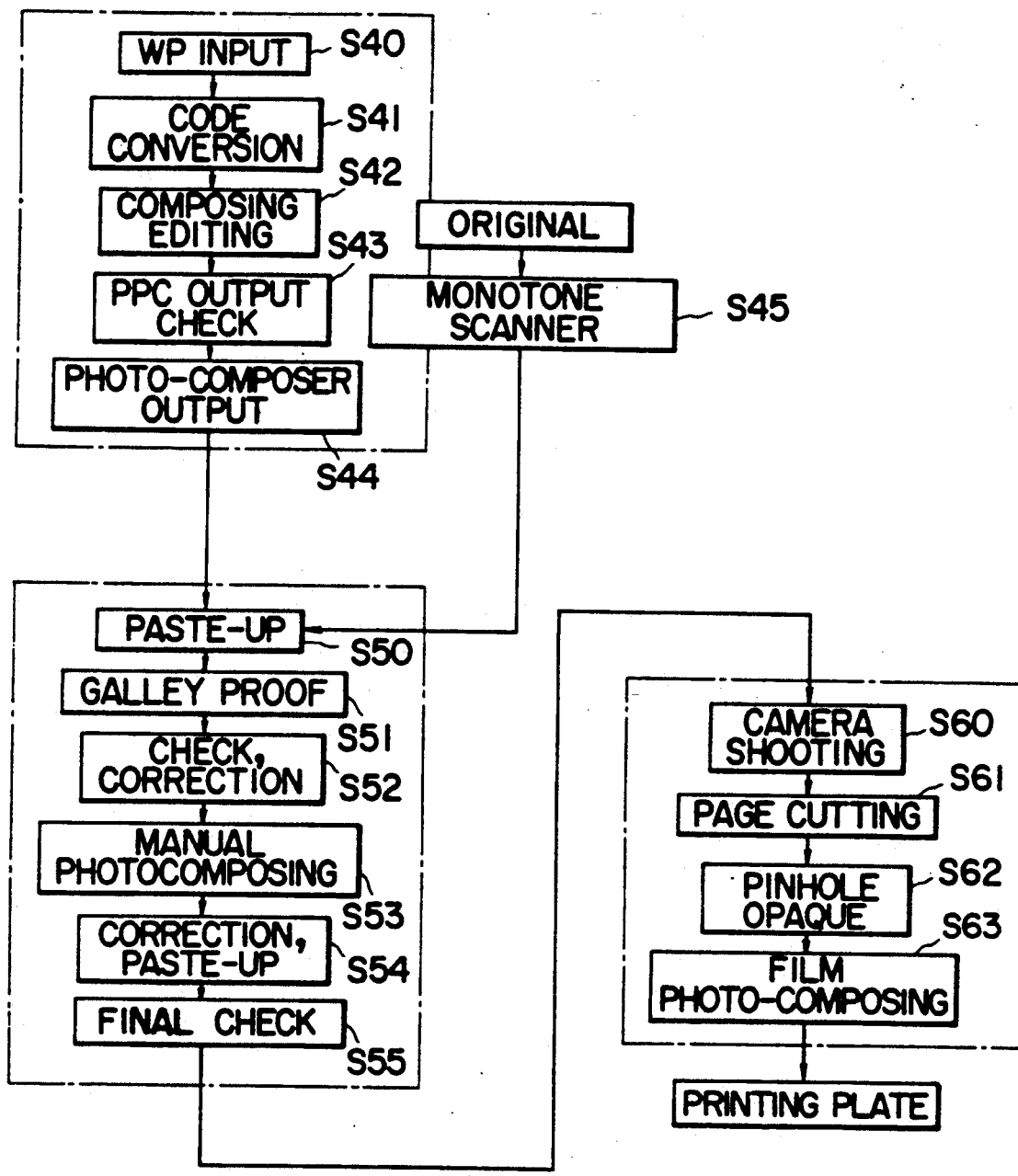
FIG. 1 is a flow chart showing a process of manufacturing conventional printing plates.
Figure 2:
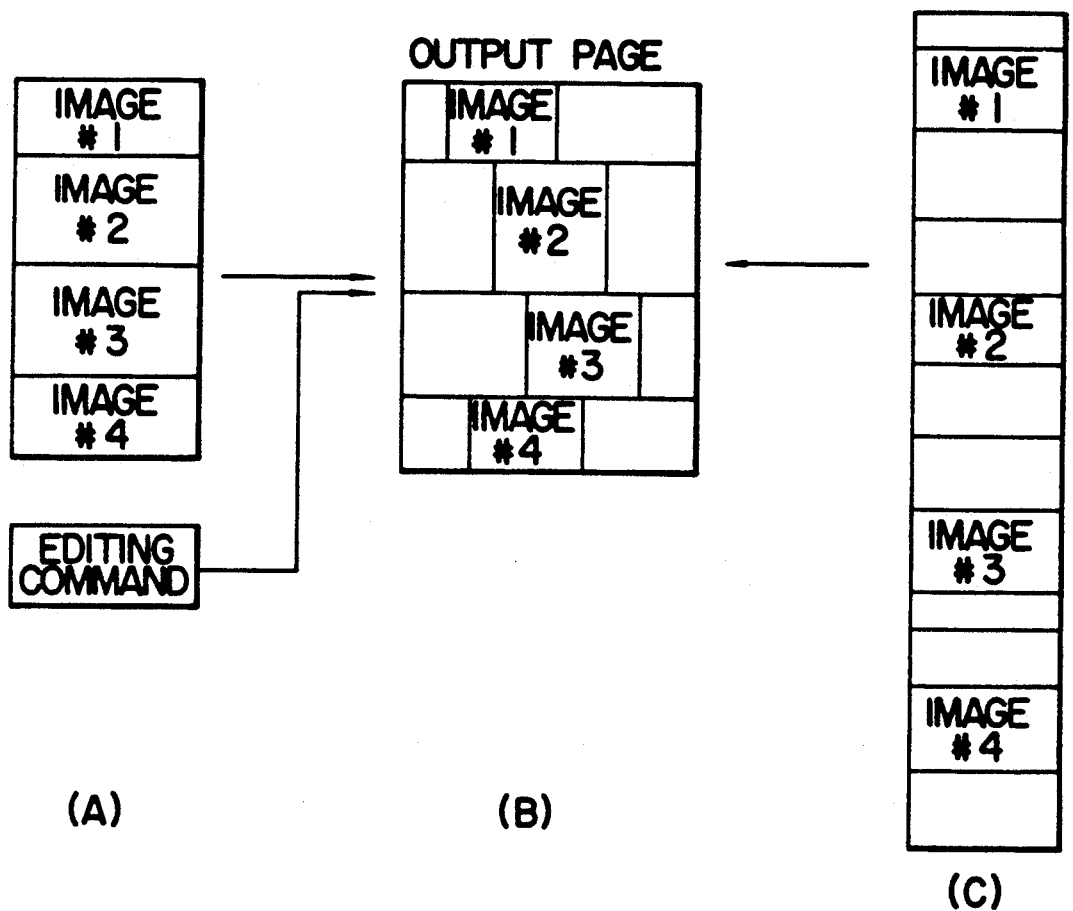
FIG. 2 is a schematic chart showing a relation of the image processes between this invention and the prior art.

In the image processing system according to this invention, data stored in a memory are divided into original data image #1-#4 and editing command as shown in FIG. 2 (A) for the output page shown in FIG. 2 (B), and the editing command designates areas (positions) of the respective image and non-image portions and the attributes (180° -rotation, mirror image, white/black inversion etc). As stated above, this invention separates the respective image data which output for each page from the commands which edit the respective images, and controls by separating the data of a unit of page into the blocks and the sub-blocks. Therefore, the information on the non-image portion is all right with only the area and the white/black, and the data is sufficient to have only one image even if the same image is referred at plural numbers in one page. In this connection, according to this invention, it is possible to reduce the memory capacity and further to perform different processes for the respective images which constitute of one page.

Figure 3A:
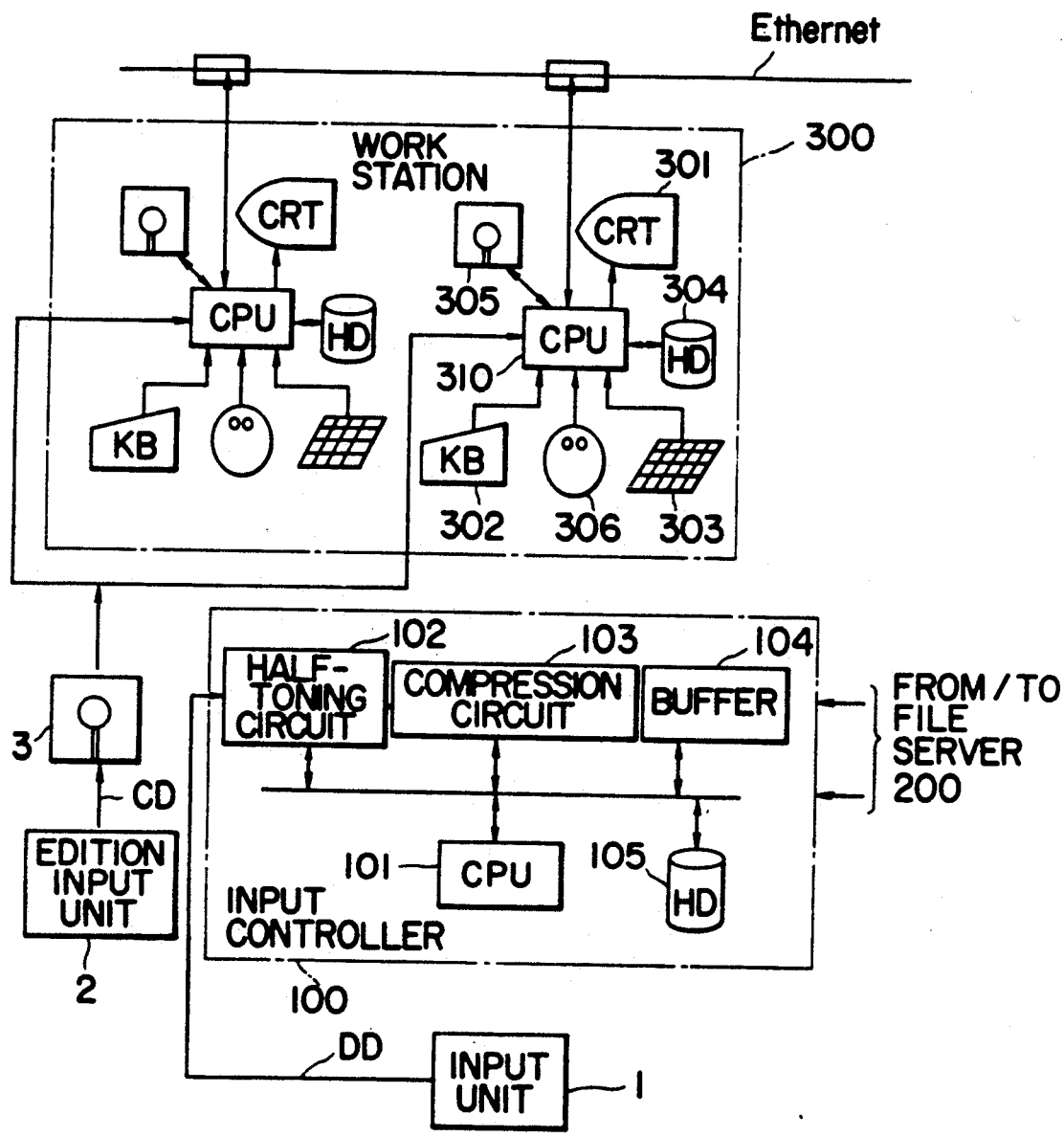
FIGS. 3A and 3B are blcok diagrams showing the overall configuration of this invention.
Figure 3B:
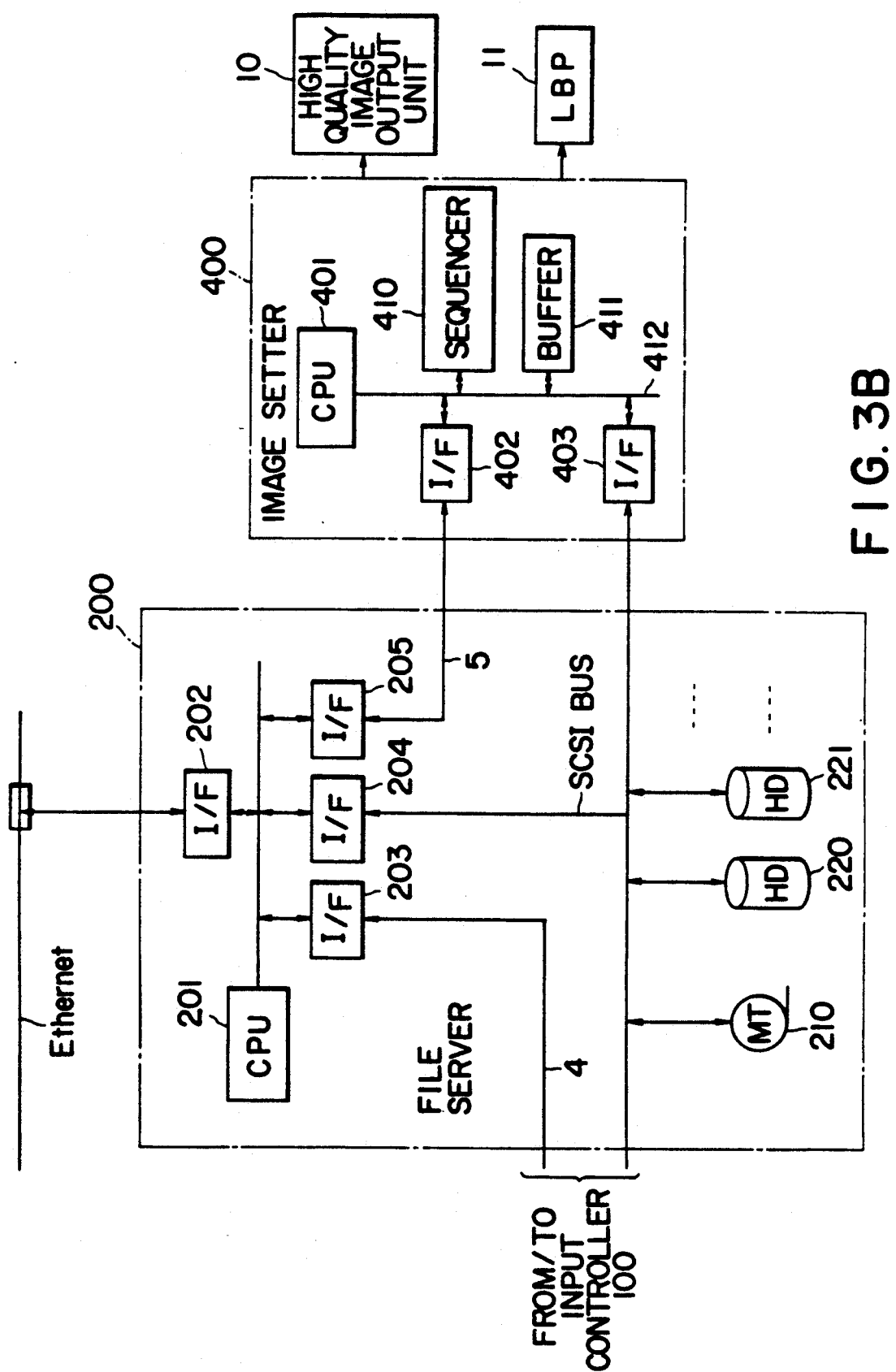

FIGS. 3A and 3B are block diagrams showing the whole arrangement of a system according to this invention. An input unit 1 (such as a scanner or the like) is adapted to read originals such as designs, characters, patterns and the like. Density data (or tone data) DD of the image as obtained by the input unit 1 are inputted to an input controller 100. The input controller 100 dots the aforementioned inputted density data DD through an incorporated CPU 101 by means of a halftoning circuit 102 and is then compressed by a compression circuit 103. The data is temporarily stored in a buffer 104 and transferred for storing it in a magnetic tape 210 of a file server 200 or hard discs 220, 221, ... thereof. The input controller 100 includes a local disc (hard disc) 105 for temporarily storing the data. The file server 200 is provided with a CPU 201 and connected to another apparatus by interfaces 202 to 205. A code information CD such as characters and the like which is obtained by an edition input unit 2 such as a word processor and a composing machine is once stored in a floppy disc 3 and then read out. The code information CD is then inputted to a work station 300. This input may be inputted in on-line. The work station 300 carries a plurality of terminal units each having a CRT 301 as a display means, a keyboard 302 as an input operative means, a mouse 306, a digitizer 303, a hard disc 304 as a memory means, and a floppy disc 305. The work station 300 is interconnected by an Ethernet (one type of bus line systems) to the file server 200 compressed image data and contour display image data (as will be described later) obtained by the input controller 100, which are thinned (selected) for CRT dispaly are stored in the magnetic tape 210 or the hard discs 220, 221, ... These two data are transferred by interfaces 204, 202 read out through an SCSI bus to the work station 300. A control command and the like between the work station 300 and the input controller 100 are transferred through the interface 203 of the file server 200 to which an image setter 400 is connected. More specifically, the image setter 400 is formed with a CPU 401 which is connected by an interface 402 to an auxiliary data line 5 of the file server 200 and is coupled by an interface 403 to the SCSI bus. The image setter 400 further includes a sequencer 410 and a buffer 411 for storing a required data. A high quality image output unit 10 for outputting the image of high quality image and a laser beam printer 11 for inputting the image of relatively low quality image are connected to the image setter 400. It is noted that the hard disc 220, 221, ... are adapted to previously store not only fixed data (bit map data) such as a logo, a crest and the like but also a vector font data for outputting the character.

Now, the input unit 1 is adapted to digitize all of the design (gray scale image or half-tone image), line image, and the character image (binary image) by means of density data (8 bit/picture element). A signal inputted based on 9 bit/picture element causes the design to be dotted by the input controller 100 so that an information (4 bit/picture element) may be provided. The binary image is converted to an information (1 bit/ picture element). These 4 bits/picture element and 1 bit/picture element are compressed for use in the LBP 11 and the high quality image output unit 10. In addition the data for CRT display and contour display are thinned. Although the character is inputted by a code from the work station 300, it may be inputted in an image form from the input unit 1. As result, even if what is inputted in the form of an image is the character, it is treated as the image (bit map data). The image is outputted independently by the image setter 400. However, the image setter 400 is intended to convert all of code and vector informations to the bit map data so that the image output as referred to herein is used to mean the output of the bit map data.

Figure 4:
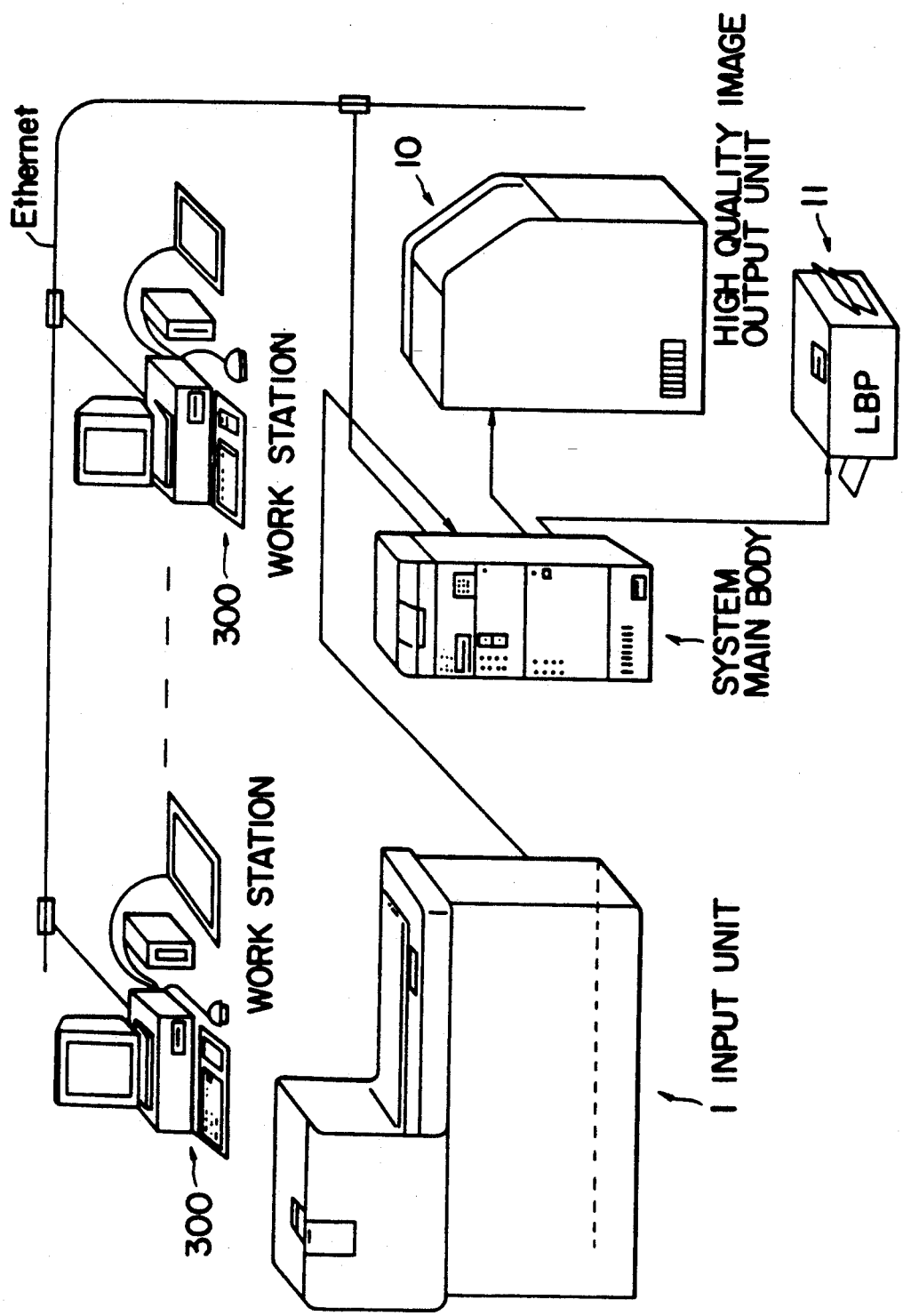
FIG. 4 is a perspective view showing one example of the configurations according to this invention.

FIG. 4 is a schematic view showing the outlay of the system described above. The system main body incorporated the input controller 100, the file server 200, and the image setter 400 and includes the input unit 1 and a plurality of the work stations 300 connected thereto so that the processed image may be outputted from the high quality image output unit 10 or the laser beam printer 11.

Figure 5:
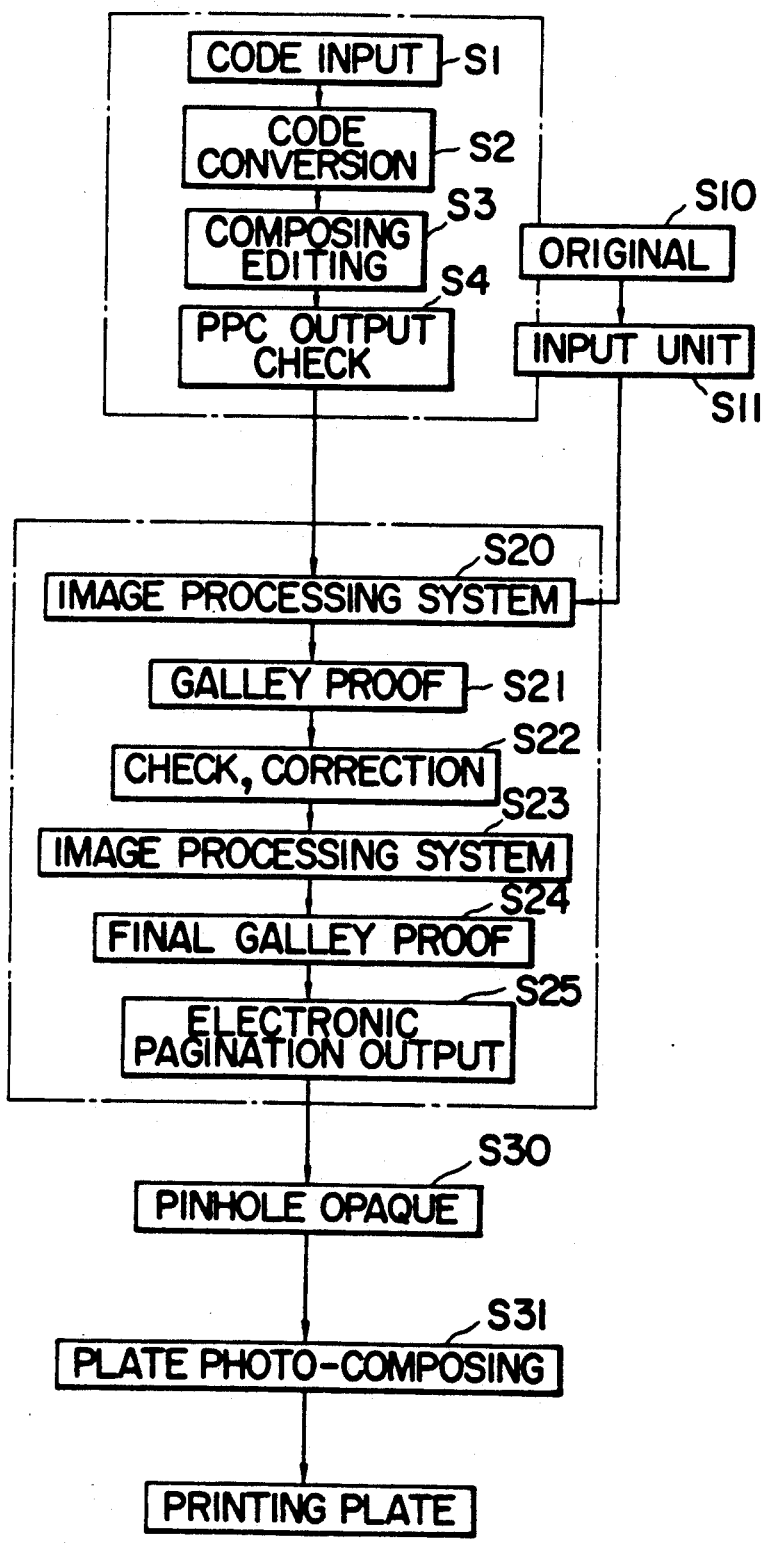
FIG. 5 is a flow chart showing one example of the operation according to this invention.

FIG. 5 is a flow chart showing the sequence of the steps of the image processing system. When a code information CS prepared by the edition input unit 2 is inputted through the floppy disc 3 to the work station 300 (Step S1), a required code conversion is made (Step S2). While a composing editing (Step S3) is effected by given operations of a keyboard 302, a mouse 306, and a digitizer 303. A PPC output image is checked (Step S4) against the editing data obtained through the aforementioned steps to transfer the data to the image processing system (Step S20). Alternatively, the data which are subjected to the steps such as S1, S2, S3 and S4 may be inputted by the floppy disc 3 to the image processing system. On the other hand, the originals such as the design, character or the like are read out by the input unit 1 (Steps S10 and S22). The read data are then inputted to the image processing system (Step S20). The code information CD and the density data DD inputted to the image processing system are subjected to processed (as will be described later) by the input controller 100, the file server 200, the work station 300, and the image setter 400 and are then outputted (Step S21) as a galley proof by the laser beam printer 11. These information and data are checked by the human eye and subjected to a data correction (Step S22) by the use of the work station 300. The corrected data are transferred to the magnetic tape 210 or the hard discs 220, 221, ... and are stored thereon (Step S23). The final galley proof is outputted (Step S24) with respect to the stored and corrected data. Subsequently, an electronic pagenation output (Step S25) is outputted to the high quality image output unit 10 to then subject the galley proof to a pinhole opaque (Step S30), thereby applying a plate photo-composing, for instance, a four photo-composing of A4 size to obtain a print film, photo-sensitive paper and a print photo (Step S31).

In this manner, the image processing system of this invention requires neither manual paste-up of drawings and photographs nor manual photo-composing to facilitate reduction of labor and material.

Each of the components and the operation of the system will be described hereinafter.

Figure 6:
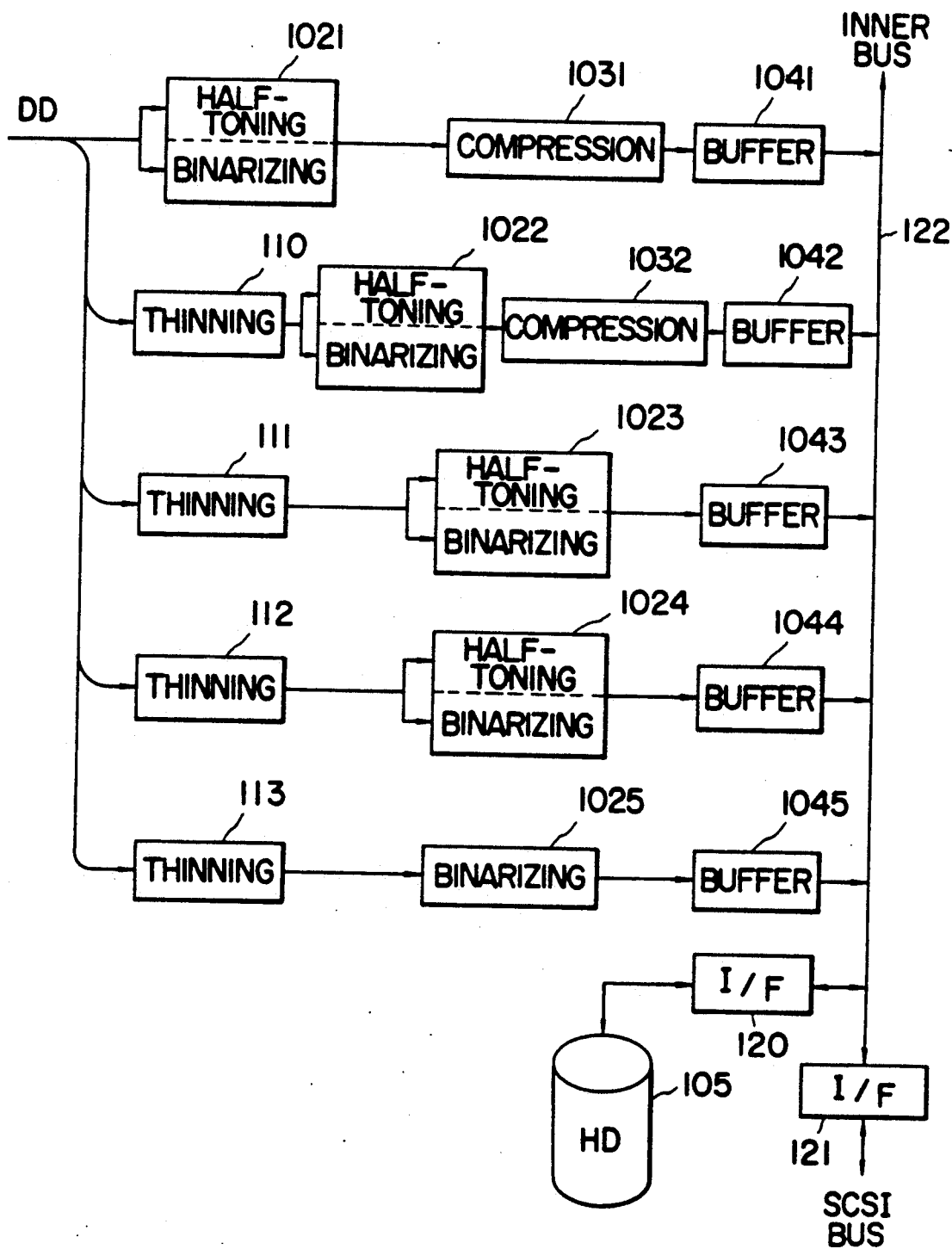
FIG. 6 is a block diagram showing one example of the configurations of the input controller.

Now, the input controller 100 will be illustrated with reference to FIG. 6. The input controller 100 is adapted to creatively process the density data DD inputted from the input unit 1 simultaneously with five sets a data which consist of high density data for the high quality image output unit 10 data for the laser beam printer 11, two types of data for displaying the CRT 301 of the work station 300, and pattern data made rough enough to show the contour. The data are subjected to such simultaneous processing in overlap manner to accelerate the speed so that the data forming operation load of the CPU 101 may be reduced by a hardware. The high density data for the high quality image output unit 10 is dotted by a halftoning circuit 1021 and data-compressed by a compression circuit 1031, the compressed data being held in a buffer 1041. Data used for allowing the laser beam printer 11 of relatively low quality image to output the image are subjected to the density data DD which are thinned (110) at a predetermined distance (for instance ⅓). The rough data are dotted by another halftoning circuit 1022 and compressed by another compression circuit 1032 and then temporarily heldin another buffer 1042. Two types of rougher data for CRT 301 display are caused to thin the density data DD at a predetermined distance and are then dotted by different halftoning circuits 1023, 1024 and then temporarily held indifferent buffers 1043, 1044. When a cut-out mask is formed of a half-tone image, the image data after Laplacian or unsharp mask processing for showing contour data are thinned and then binarized by a binary circuit 1025 and also temporarily stored in a buffer 1045. The Laplacian or unsharp mask processing is effectfed ahead of the input unit 1 or before thinning processing (113). In case of the CRT, the image is thinned at a selection rate by which the inputted image zone may be displayed at its maximum and at another selection rate by which the image is displayed in the form of a one page layout whereas contoure data is thinned at a selection rate of ⅓ when it is CRT displayed with accuracy one half of picture element density of the high quality image output unit 10.

It is noted that the buffers 1041 to 1045 are connected to an inner bus 122 and by an interface 121 to an SCSI bus, and that the half-toning circuits 1022, 1023 and 1024 function as binarization. A local disc 105 is connected by an interface 120 to the inner bus 122.

With this arrangement, the CPU 101 communicates with the input unit 1 by a data line (not shown) and also communicates through an auxiliary data line 4 and a dual port RAM (not shown) to the file server 200. When a data transmission request from the input unit 1 is made, the CPU 101 is caused to set the data required for the respective circuits as shown in FIG. 6. The set data are stored in the local disc 105 while a set point in association with sub-scanning is set. The density data DD from the input unit 1 are inputted every one line and stored in the buffers 104 (1041 to 1045) upon synchronization of the respective circuits shown in FIG. 6. During the period of this time, the CPU 101 checks not only a changeover of the SCSI bus and of a data compressing output buffer 1041 but also a presence of error information from the respective circuits. The once stored in the buffer 104 and the local disc 105 are stored by the command of the CPU 101 and outputted to the SCSI bus from without. In this instance, the inpt controller 100 communicates with the file serve 200 when the data are employed in on-line, resulting in provision of an address on the SCSI bus a whereas the input controller 100 establishes a file control of the magnetic tap 210 when the data are used in off-line (input controller 100 solely).

Now, the dotting circuit and compression circuit will be specified hereunder with reference to the drawings.

Figure 7:
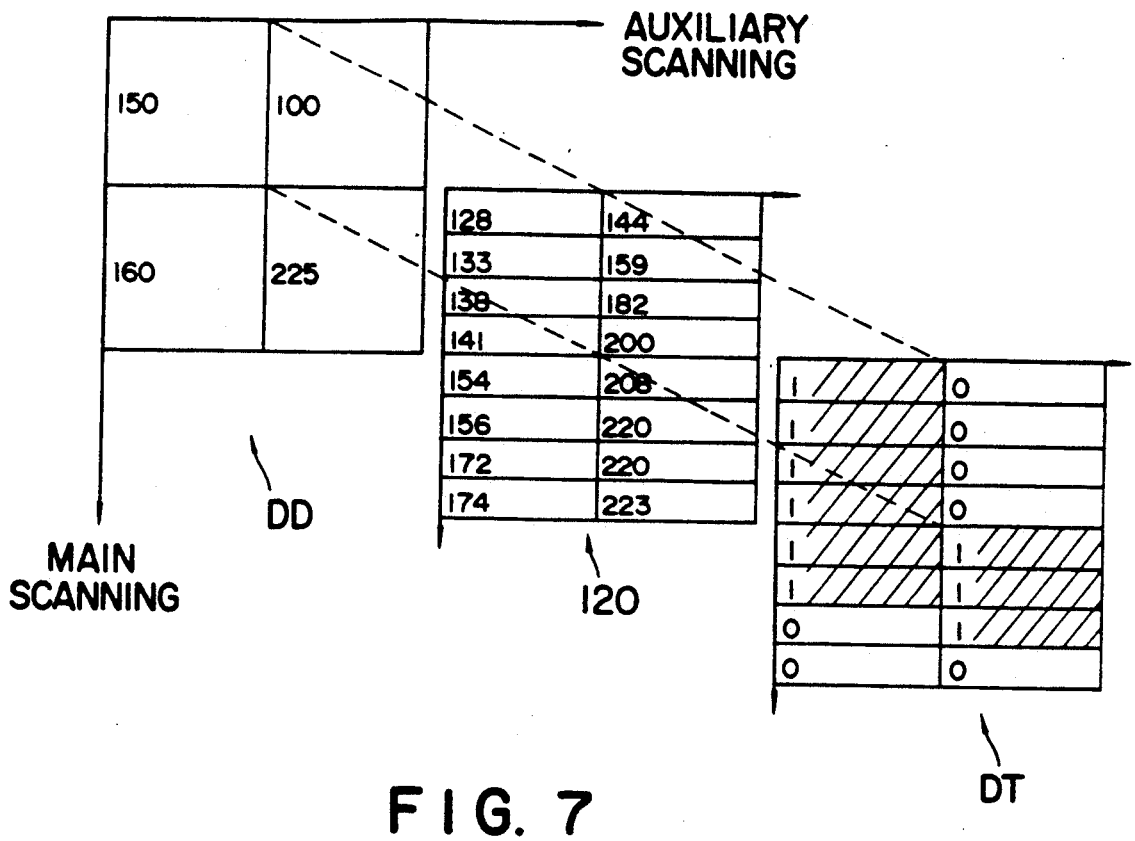
Figure 9:
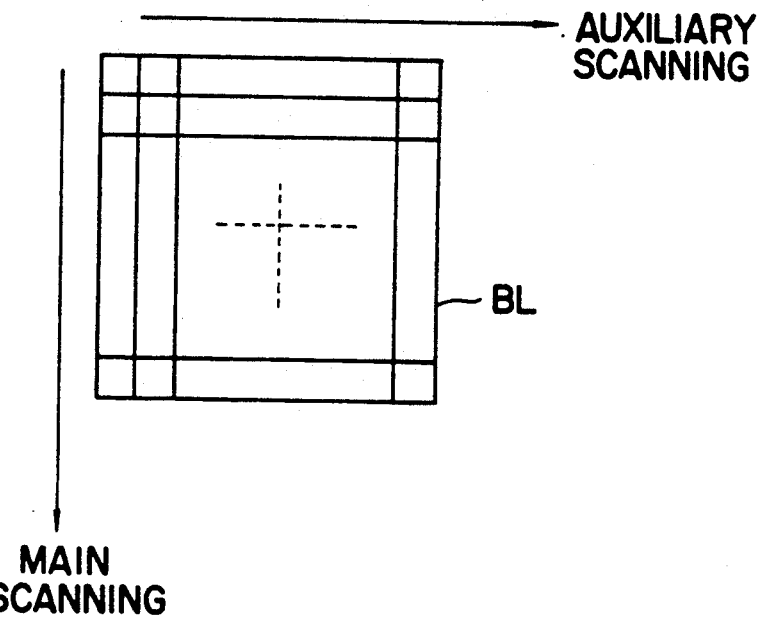

FIG. 7 shows a manner in which dotted data DT are obtained by the density data DD and a threshold matrix 120. As is apparent from FIG. 6, the binary dotted data DD of 4 bits per one picture element are formed by comparing four thresholds per one picture element to density level values "0"~"255" (8 bits) of the inputted density data. If the level value of the inputted density data DD is higher or lower than the threshold of each bit of the threshold matrix 120, the dotted data are representative of "1" (black) or "0" (white). In other words, the each bit threshold of the threshold matrix 120 is independent of the level value of the picture element bus solely depends on the coordinates of the picture element. As is understood from a dotting threshold data DT1 shown in FIG. 8, the size of coded block BL twice the dotting threshold data DT1, that is, two dotted units so that a coded system by which one picture element is put as 4 bits as indicated at PL may be employed (dotted image to which 150 lines and 45° are plotted). As a result, the size of the coded block BL is the two dotted unit to obtain the image of 100 picture element/block. Thus, the density data DD is binarized by the threshold matrix 120 every block as shown in FIG. 9 to obtain dotted data DT2 as seen from FIG. 10. Next, the density data (4 bits) dotted in the block BL are rearranged in the order of value of the four thresholds every picture element of the threshold matrix 120. Rearrangement of these data are made in the order of fixed value as determined by the threshold matrix 120. More specifically, the threshold every bit of the threshold matrix 120 is fixed as shown in FIG. 8 so that the image data as well as the bit data of each picture element may be rearranged in the order of value of the threshold, thereby establishing rearrangement of all the density data in the order of value of the threshold as shown in FIG. 11. The rearranged dotted data DT3 of 400 bits are coded every 8 bits in such a manner that they are scanned in 8 bits from the beginning to obtain the number of units in 8 bits followed by "0" as well as 8 bits. This group is termed white section W of length "0"~"50" and is thus coded by 6 bits. The rearranged dotted data DT3 of 400 bits are scanned in 8 bits from the rearmost end to obtain the number of units in 8 bits followed by "1" as well as 8 bits. This second group is termed block section B of length "0"~"50" and is thus coded by 6 bits. Intermediate data other than black and white sections W, B of the rearranged dotted data DD3 of 400 bits are termed intermediate data. These intermediate data are provided with only 25 types of patterns as illustrated from a code table 0~3 of FIG. 12 as a result of the aforementioned rearrangement as viewed from a unit of 8 bits. These data are all coded fixedly by a coded code of 5 bits. Stated otherwise, the intermediate data of 8 bits may be compressed into the data of 5 bits. In general, the number l of the picture elements is put as an integer and coded to be $(n+1)^l$ types of patterns when such coding is made in $1 \times n$ (number dotted data per picture element) to substitute $2^{x-1} < (n+1)^l \leq 2^x$ of X bits. The data as shown in FIG. 13 of alloted to those codes, "11001, 11010, 11011,11110 and 11111" illustrated in code tables 1 to 3 of FIG. 11 to a higher compression rate. In other words, when the aforementioned $2^x - (n+1)^l$ is not "0", $(2^x - (n+1)^l)$ types of codes are assigned to specific patterns of the intermediate section as legends for the B section.

Operation of the file server 200 will be apparent from the following description.

The file server 200 is fablicated in the manner as shown in FIGS. 3A and 3B and functions common file controls such as file control and community of file, and control of network communication and communication between units. More specifically, the five server 200 passes through the SCSI bus to control the file for the hard discs 220, 221, ..., and the magnetic tape 210 and is caused through the Ethernet to provide function as a software interface for the work station 300. The file server 200 fulfills an untility function with respect to service for a file control information on the input controller 100 and the image setter 400 and with respect to a file control via the SCSI bus. Such utility functions are, for instance, a registration of font and a gerbage collection (dust pick-up and disposal). The registration of font may be classified into two types of registration. The first type of the font registration is supported by a system, wherein a vector font prepared by a different font preparation system is stored as a magnetic tape form in the hard disc of the image processing system. Another type of the font registration is a registration of external characters which do not exist in the system. In this instance, the font prepared by another system is registered in the floppy or magnetic tape. Alternatively, the character image may be read out by the input unit to regist raster data after vector processing. The reasony why the garbage collection is made is as follows. The instant image processing system requires for the hard discs 220, 221, . . . in the file server 200 to erase the prepared files many times. Accordingly, the effective available zone in the hard discs present vermiculated spots. Notwithstanding, for the system it is convenient to continue vacant zones or areas and the attain high speed access to the file in order to allot the area to a fresh file. To this end, a general cleaning of the hard disc is made in such a manner that vacant and struggled zone are collected to incorporate the available file in the continous zone. rendering the vacant areas continous. This is termed the garbage collection (dust pick-up and disposal).

The file server 200 is adapted to perform service and stored the data for transferring the data between the work station 300 and the input controller 100 and between the latter and the image setter 400. The input controller 100 serves to obtain required information from the auxiliary data line 4 and the dual port RAM. For the purpose of registration, the data which is once held in the buffer 104 wherein the input controller as the file for the image processing system, informations on the file name, file capacity and the like are transferred to the file server 200 to allow the hard discs 220, 221, . . . on the SCSI bus access thereto. This will enable the file server 200 to communicate with a directory and to control a disc area and the like. The file server 200 is also adapted to transfer the file data by the Ethernet to the work station 300 and receive the data from the work station. At this moment, the file server 200 controls the hard discs 220, 221 . . . on the SCSI bus and the magnetic tape 210 under the command of the work station 300 to renew information required for the directory and the like. As a result, the file server obtains the command over the image setter 400 and the other command over the magnetic tape, thereby performing service according to those commands. A predetermined command is issued by the auxiliary data line 5 and the dual port RAM to the image setter 400 whereas the file control information is sent upon request from the image setter 400 to allow the latter access to the disc data on the SCSI bus. Further, the utility information as to the image processing system as a whole is controlled by the hard discs 220, 221, . . . on the SCSI bus and subjected to font information and common files and the like in the system.

Figure 15:
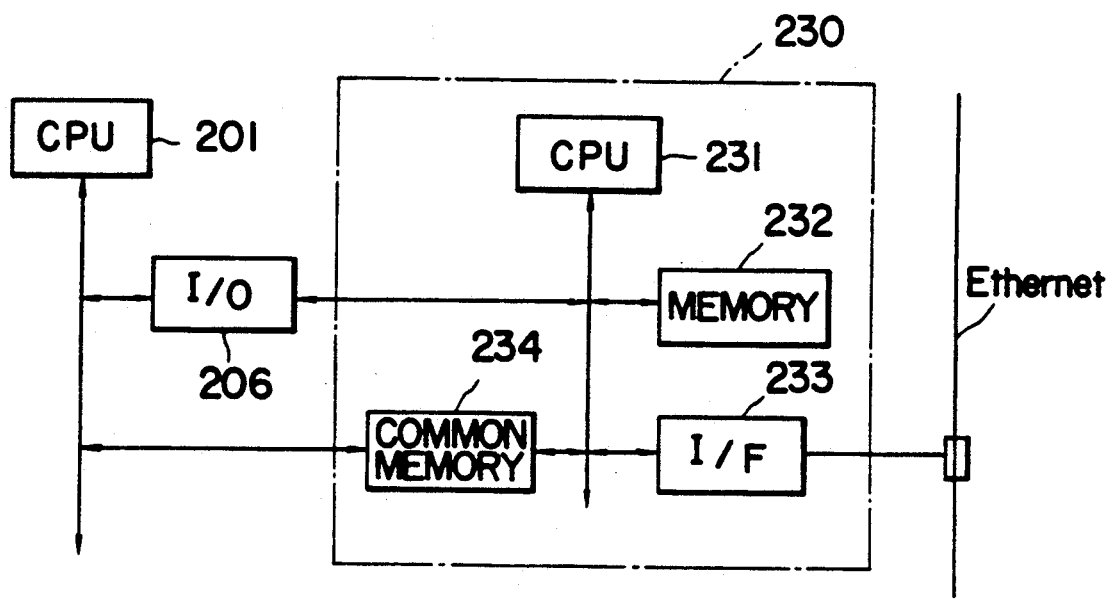
FIG. 15 is a diagram showing one example of the configurations of the Ethernet board inside the file server 200.

In this connection, it is noted that an IBM-AT Ethernet board is used to facilitate a support (TCP/IP protocol) for the Ethernet. A fundamental configuration for driving such Ethernet board is similar to that of the IBM-AT and is actuated on an MS-DOS to reading realize the TCP/IP protocol. The protocol is meant to refer to a communication rule established between hosts for communicating. A seven layer OSI (International Organization for Standardization) model has been suggested by the OSI. The seven protocol layers range from a Physical Layer to an Application Layer as shown in FIG. 14, depending upon abstractness of communication. For instance, the Physical Layer carries out a rule of "0", "1" according to voltage level whereas a data link layer follows a rule of data transfer in a lamp and error detection. A network layer includes a communication rule for determining a destination of the data in a packet and an indication of the sequence of the packet. The TCP/IP protocol is a communication rule which is corresponding to a transport layer and established between the hosts. The TCP/IP protocol is capable of establishment of connection with a mating host, transfer of buffer data between the hosts, and establishment of multi-connection with a plurality of the hosts. The Ethernet board is a type of an extended board of a personal computer, which incorporates, the CPU for communication, by the Ethernet. The IBM-AT Ethernet board is a type of a board which is corresponding to a CPU bus and an extended slot of the IBM-AT personal computer to support a protocol layer laid downwardly of the TCP/IP protocol (OSC model transport layer of the ISO). As shown in FIG. 15, a CPU 201 of the IBM-AT and a CPU 231 of the Ethernet are adapted to send and receive the data with a common memory 234 in an I/O port 206 and the Ethernet board. These exists a software for realizing establishment of connection with the other host and multi-connection and transfer receipt of the data as functions of the TCP/IP protocol so that a communication may be made from a user program with the TCP/IP protocol. The MS-DOS is an operating system which establishes control of input and output of the disc, memory control, process control and network control, and performs function of machine interface and the like. This operating system is called as a single task OS and cannot perform a mult-task like "UNIX". However, the system provides an operation environment like "UNIX", for example, it has functions such as files of a tree-construction, file directories, pipe line processes of commands, condition decision and repetition in batch file, or input-/output redirection.

FIGS. 16A and 16B show a manner in which communication is held between the file server 200 and the input controller 100 and between the file server 200 and the image setter 400. More specifically, if a writing request on a subject image data is made from the input controller 100 to the file server 200, the file server 200 transfers data writing permission and writing address for writing the data to the input controller 100 (Step S201). In this instance, when the file names are identical with each other and the hard disc is running at full capacity and so on, the data writing permission is not obtained. When the data writing permission and the writing address are transferred from the file server 200, the input controller 100 is caused to write the image data (compressed density data) via the SCSI bus on the assigned address of the hard discs 220, 221, . . . or the magnetic tape 210 (Step S202). The data is read in the magnetic tape 210 or the hard discs 220, 221 . . . to transfer the data to the image setter 400 make writing request for the data, the subject from the image setter 400 to the file server 200 (Step S210), thereby transferring data reading out permission and reading out address of the date to be read to the image setter (Step S211). The file server 200 is then allowed to read out the data of the assigned address via the SCSI bus and transfer the data to the image setter (Step S212).

The operation of the work station 300 will be detailed hereinafter.

FIG. 17 is a flow chart showing how the work station 300 function. The work station 300 is actuated to input character code data so that a data format may be converted (Step S300) to interactively or batch-processingly prepare layout data such as an image mounting frame and the like (Step S301). Then, output data described in page descriptive languages are prepared based on these character code data and layout codes (Step S302), and are transferred to the file server 200 to instruct the output to the image setter 400 via the file server 200 (Step S303).

Figure 18:
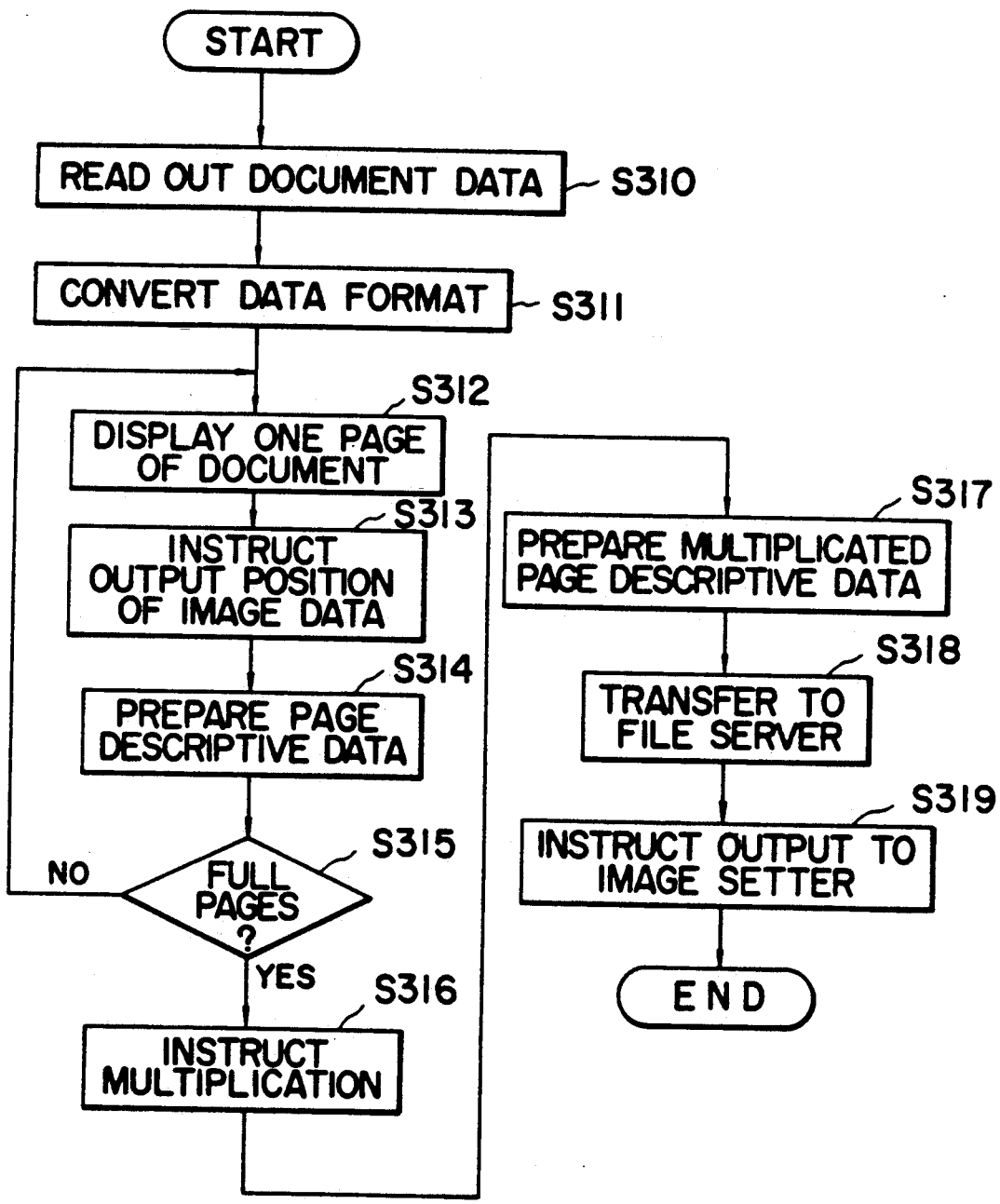

FIG. 18 is also a flow chart showing how the work station functions at full length. Document data edited and stored by the edition input unit 2 is read out of the floppy disc 3 (Step S310). A code information CD of the document data is subjected to conversion of the data format (Step S311). A content of the document in one page is then displayed in the CRT 301 (Step S312) while an image data output position is instructed by the mouse 306, the keyboard 302 and the digitizer 303 (Step S313) to prepare page description data every one page (Step S314). In this manner, the data are prepared in full pages (Step S315), and photo-composing for preparing a printing block copy is instructed by the keyboard 302 (Step S316) to obtain photocomposed page description data (Step S317). At the same time, the prepared data are transferred to the file server 300 (Step S318) simultaneously with instructing the image output to the image setter 400 for completing the operation (Step S319).

Next actual pictures displayed on the CRT 301 and the associated operation of the work station 300 will generally be described with respect to FIG. 19A through 19I.

Figure 19A:
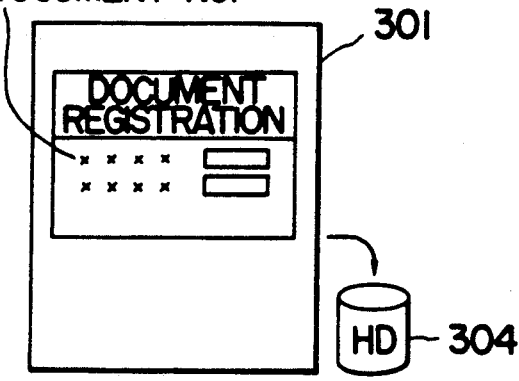
Figure 19B:
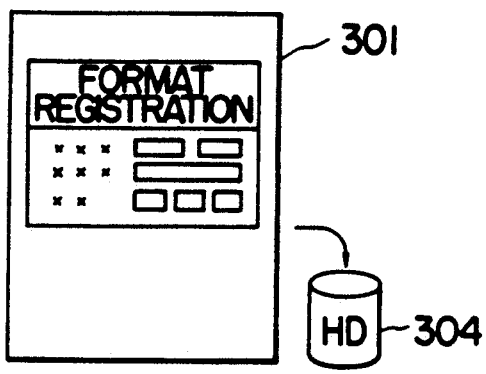
Figure 19C:
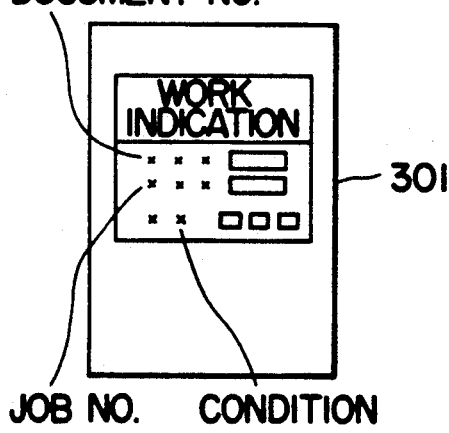
Figure 19D:
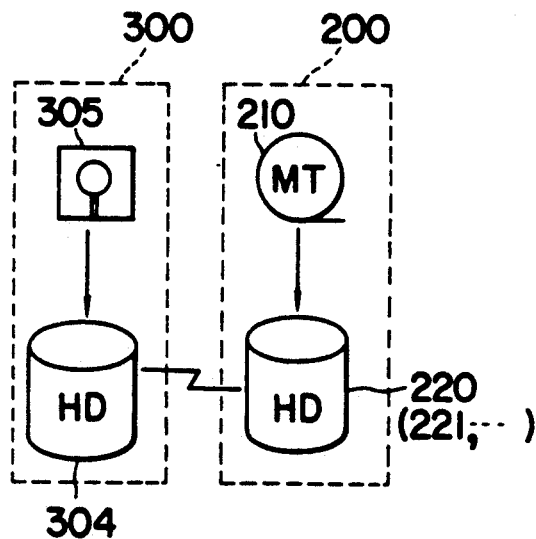
Figure 19E:
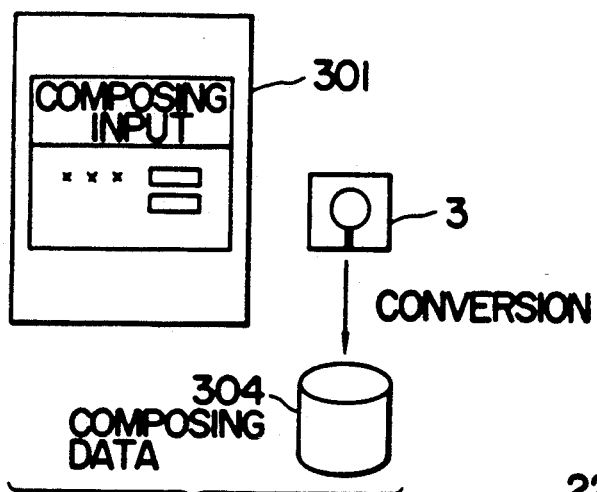
Figure 19F:
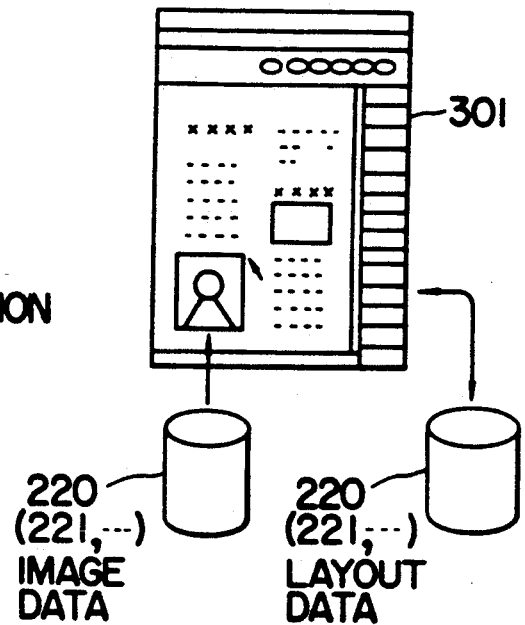
Figure 19G:
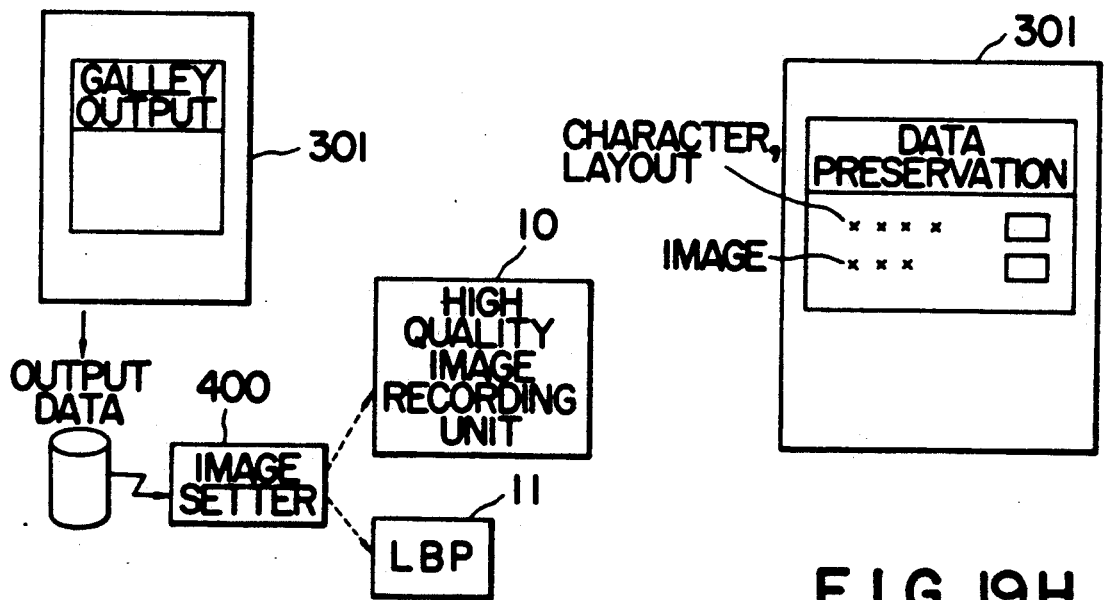
Figure 19H:
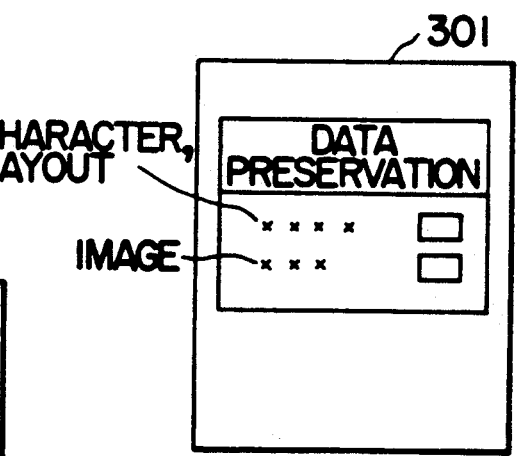
Figure 19:
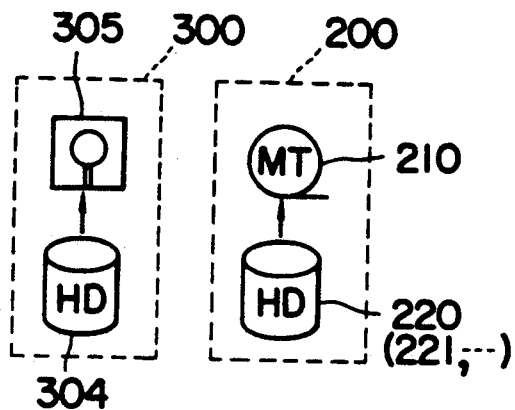

To perform editing work, preparation therefor starts with document registration and format registration. During the document registration, as shown in FIG. 19A, the number and name of a document as well as such information as comprising composing machine number, format pattern, allocation pattern and the like which are also to be given to individual documents are registered with aid of a document registration sheet displayed on the CRT 301 to be stored in the document in the document management file inside the hard disc 304. This registration of the relevant information is initially made once each document. Likewise, during the format registration, as shown in FIG. 19B, a format for each document is registered with aid of the format registration sheet on the display to be stored in the document management file. With a document the format pattern of which has already been registered, the format pattern may be modified with the aid of the format registration sheet utilizing the keyboard 302. The editing work is effected by following such steps as initiation of the operation, preparation of operation, input and conversion of composition data, output of galley and/or block copy, and completion of the editing operation. To be more specific, the document number and job number are sequentially designated with the aid of such a work indication sheet displayed on the CRT as shown in FIG. 19C, and then the initiation of the editing work is performed with the mouse 306. In addition, the mouse 306 is used to indicate, as working conditions, display of image, output of galley output of block copy, and addition or alteration of image. In accordance with the indicated working conditions, character orlayout data (floppy disc 305) and various kinds of image data (the hard discs 220, 221, ... of the file server 200 or the magnetic tape 210) are loaded in the hard disc 304, as shown in FIG. 19D. The series of the above processing is started as a background job and is processed in overlapping manner, and a layout scope for editing work is displayed uponj completion of data loading. Subsequently, the indication of a new input (or replacement) or additional input is, as shown in FIG. 19E, made in regard to what is to be inputted with the aid of a composition data input sheet on the display, and then the floppy disc 3 is set in a given position, and composition data are inputted to be stored in the hard disc 304. In this case, the data conversion is automatically effected, and the composition data input processing is started as a background job and is performed in parallel with other data processing. Subsequently, as shown in FIG. 19F, the page to be editted is designated, and the contents thereof are then displayed. After a frame is designated, designation of the line(s), graph(s) and tint is also made. In other words, the number of pages to be edited is directly or indirectly (next, previous) designated using the layout scope, and in a case where the page to be edited is already present, the character and layout are displayed on the CRT 301 in the form of WYSIWYG (which stands for "What You See Is What You Get" and means that you can obtain a hard copy of what is displayed on the CRT 301). An area in which images are displayed is called a frame, and this frame is configured by means of the pointing of the mouse 306 or of the operation the keyboard 302 selecting a number of commands displayed on the CRT 301 and then displaying input on the CRT 301 in the form of WYSIWYG. Subsequently, the image number to be put in the frame is designated by means of the keyboard 302, and the image data stored in the hard disc 220, ... is displayed on the CRT 301 by giving a re-display command and the like. In addition to this, rules, enclosing rules, tint and the like are formed by means of the mouse 306 or the keyboard 302 selecting the numbers of various kinds of commands displayed on the CRT 301 and displaying them on the CRT 301 in the form of WYSIWYG. Following this, the designation of the page to be outputted, the number of copies to be made and the like is effected with the aid of a galley or a block copy output sheet as shown in FIG. 19G, indication of the required output thus being effected. The editing data (character data and layout data) are automatically converted to the output data, which are then stored in the hard discs 220, 221,..., and then stored output data are outputted from the high quality image output machine 10 or the laser beam printer 11 via the image setter 400. As will be explained hereinafter, this output processing is started as a background job, and a plurality of reguests for output therefrom are put in the output queue of the image setter 400. There being only one CPU, various reguests made during the process with respect to hardware or software have to be registered in order. With a view to dealing with this, the output queue is used to keep the requests waiting in order for processing. Finally, the indication of preservation forms for the character, the layout and image data are effected with the aid of a data preservation sheet which is displayed on the CRT 301 when the preservation and the completion is indicated, and in accordance with the preservation forms so indicated as shown in FIGS. 19H and 19I, the character and layout data, and various image data are, respectively, stored in the floppy disc 305 and the hard discs 220, 221, ... of the file server 200 or the magnetic tape 210. Subsequently, when indication of the editing work is effected with the aid of the work indication sheet, every processing is terminated, with the processing queue being left as they are, and finally the power supply is cut off.

Figure 20:
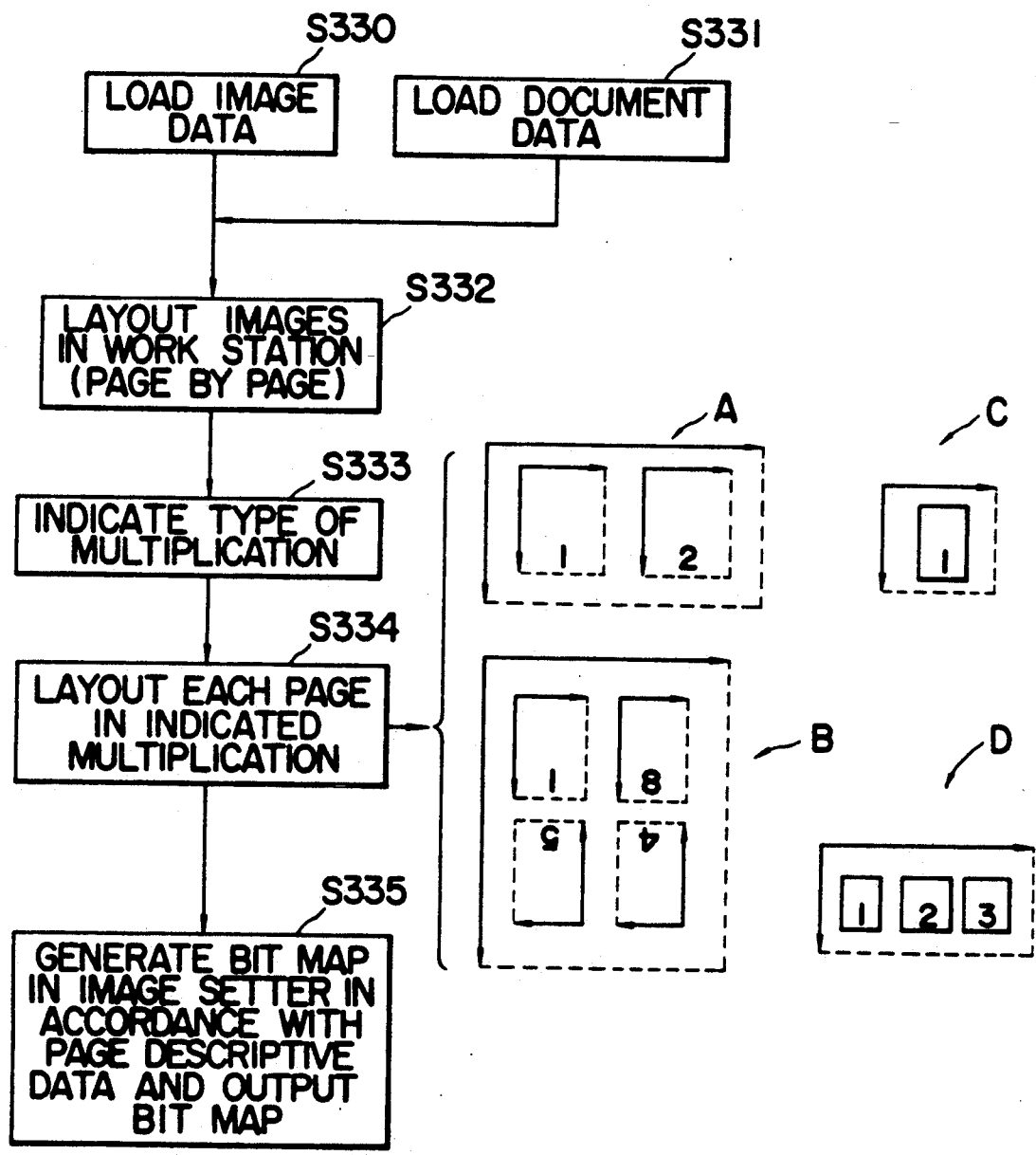
FIG. 20 is a diagram showing the operation of photocomposing according to this invention.

Referring to FIG. 20, the above mentioned photocomposing process will now be described. The image data in the hard discs 220, 221, ... of the file server 200 are loaded in the work station 300 (Step S330), and the document data in the floppy disc 3 are also loaded in the work station 300 (Step S331). Then, the necessary information is displayed on the CRT 301 of the work station 300, thus making it possible to suitably layout the images and documents, by page by page, by operating the mouse 306, the keyboard 302 and the digitizer 303 (Step S332). When indicating any of the types of photo-composing registered in advance with the keyboard 302 (Step S333), each page is displayed on the CRT 301 as being laid out in the indicated photo-composed state (for instance, "A" to "D" as shown in FIG. 20), with a suitable page number being given thereon (Step S334). The photo-composing state of each page is registered and stored with a proper page number being given thereon in advance with consideration given to the process of folding a plurality of pages in book binding, and, for instance, takes the form of four pages of paper of a trimmed size of A4, or eight pages of paper of a trimmed size of A5. When selecting and indicating any of the types of photo-composing states, the photo-composing state so selected is displayed with the proper page numbers being given to the associated pages (for instance, "1", "8", "5", "4", in FIG. B), as "A" to "D" shown in FIG. 20. The display of layout on the CRT 301 on this occasion is designed to show only the photo-composing states of the pages, and the contents of the pages such as the images and characters thereon are not displayed, bit maps which will be explained hereinafter being generated by the image setter 400 in accordance with the page description data and then outputted (Step S335).

Figure 21:
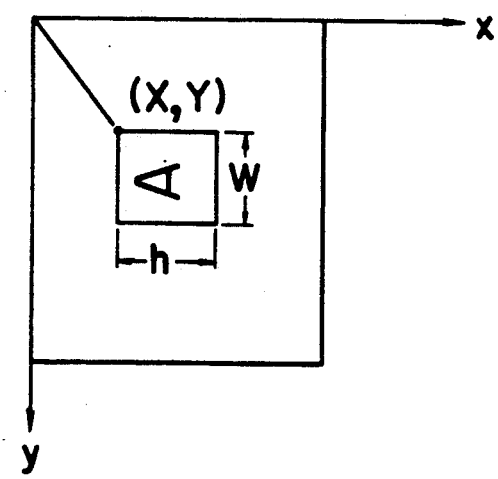
FIG. 21 is a diagram explaining the page description data.

The page description data are the form of indication used to indicate the character output, graph drawing and image output. With the character output, it is possible to print an arbitrary character of an arbitrary size at an arbitrary position (a position of two dimensions), the character also being able to be rotated and tilted at arbitrary angles, and shortened horizontally and vertically at arbitrary rates. FIG. 21 is a diagram showing the character "A" having a width W and a height H which is located at the position (X,Y) on the xy-coordinates and rotated through 90 degrees thereat. With the page description data, indication of the position, size, rotational angle and the like of a character is effected by giving the relevant commands. With the graph drawing, it is possible to give indications to such factors as drawing rules of arbitrary size and length, drawing circles, arcs and ellipses and the tint processing within the area. With the image output, it is possible to give indications to output the image data which are inputted by means of the input controller 100 and kept in the hard disc (220, ...) at arbitrary positions with arbitrary trimming effected thereon. Thus the characters, the graphs and the images can be disposed at arbitrary positions by utilizing these three types of indication commands.

Finally, the detailed configuration of the image setter 400 and the action thereof will now be described.

Figure 22:
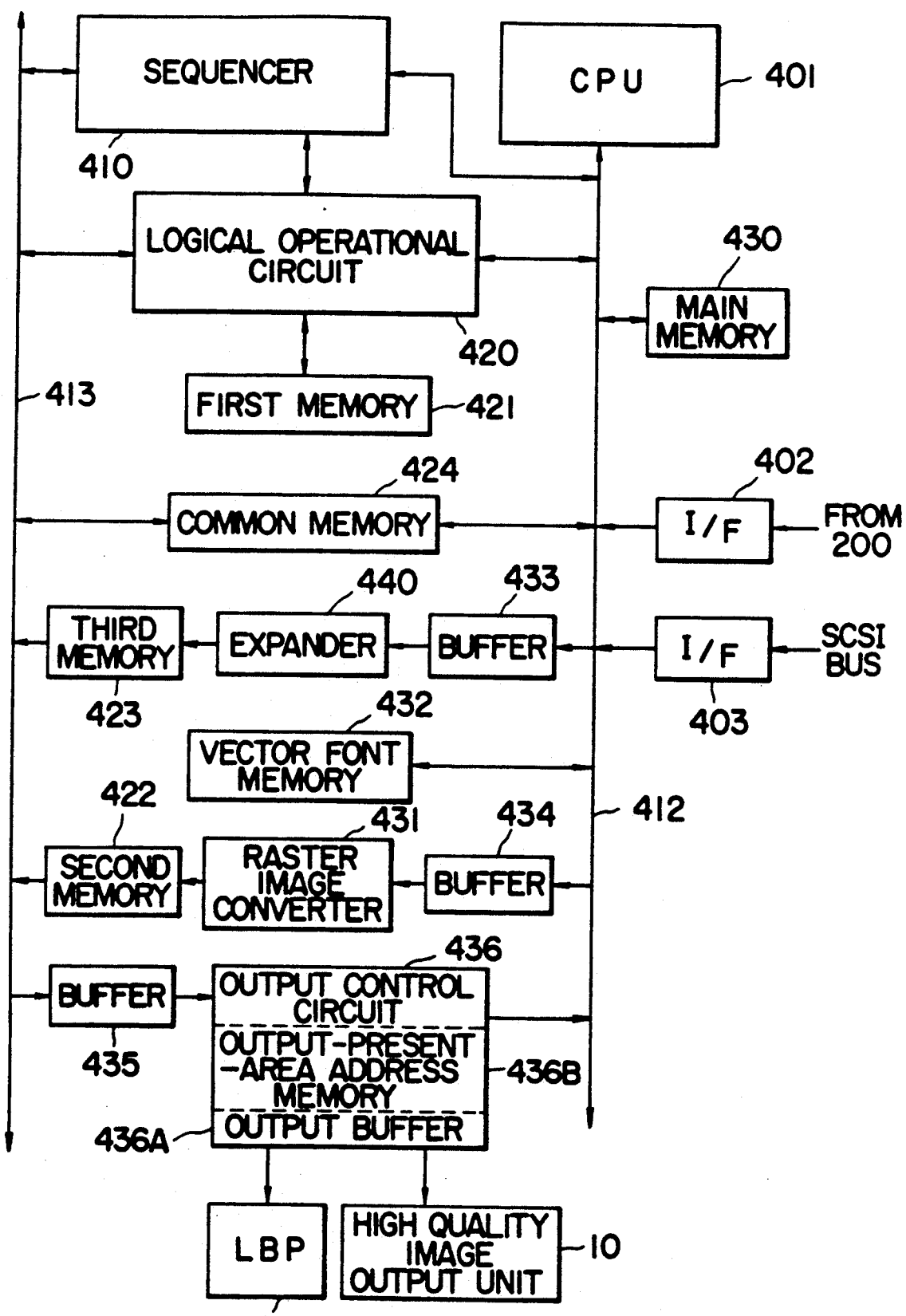
FIG. 22 is a block diagram showing in detail the configuration of the image setter.

FIG. 22 shows in detail an example of the configurations of the image setter 400. The CPU 412 and an image data bus 413 are connected to the sequencer 410, and a logical operational circuit 420 and a first memory 421 are also connected to the same sequencer 410. In addition, a main memory 430 for the CPU 401 is connected to the CPU bus 412, and a common memory 424 is disposed between the two buses 412 and 413 so as to connect the former to the latter, the output from the interfaces 402 and 403 being inputted into the CPU bus 412. A buffer 433, an expander 440 and a third memory 423 are connected to each other in that order between the CPU bus 412 and the image data bus 413, and a buffer 434, a raster image converter 431 and a second memory 422 are also connected to each other in that order between the same buses 412 and 413. In addition, a buffer 435 and an output control circuit 436 are also connected to each other between the buses 413 and 412. The output control circuit includes an output-present-area address memory 436B for storing address data which indicate the present of images when the images are outputted and an output buffer 436A which temporarily stores the output image data. A vector font memory 432 is connected to the CPU bus 412, and the high quality image output unit 10 and the laser beam printer 11 are respectively connected to the output control circuit 436 via an output buffer 436A.

Vector fonts are stored in the vector font memory 432 which are needed at the time character maps are generated by the raster image converter 431. A character bit is generated under the following processes of:

taking out the vector fonts from the vector font memory 432 to write the same in the buffer 434;

setting in the buffer 434 commands relating to the size of a bit map to generated, the rotational angle therefor and the like;

starting the raster image converter 431; and generating a predetermined character bit map in the second memory 422.

The vector fonts are normally stored in the discs (220, 221, ...), and it is not efficient to read out them via SCSI bus every time a character bit map is generated. To deal with this, every needed vector font is designed to be loaded in the vector font memory 432 in advance, thus making it possible to improve the speed at which a character bit map is generated.

The operation of the image setter 400 which is configured as described above is shown in FIG. 22. A request for output indication is outputted from the file server 200 to the image setter 400 by using a file name stored in the hard discs 220, 221, ... as a parameter. The specification to be outputted is written in the file. While sequentially decoding this specification, address computation of coded data and compressed data is performed relative to every image unit, and the overlapping processing by the logical operation is repeated relative to the address, the results of the processing then being stored in the first memory 421. Calling the parameter file via the SCSI bus, the image setter 400 repeats this operation. With regard to the coded data, for instance, the character code and such indicating information as position, type face, size and the like are inputted via the SCSI interface 403 (Step S400), and the raster image conversion of what is inputted is effected via the raster image converter 431 (Step S401), the raster image data then being stored in the second memory 422 (Step S402). In addition, the data-compressed image data are sent by way of the SCSI bus and are inputted via the interface 403 (Step S403), and the data are sent by way of the buffer 433 and are expanded by an expander 440 to be reproduced (Step S404), the reproduced image data then being stored in the third memory 423 (Step S405). Moreover, the bit map data such as logotypes and the like which are stored in the hard discs 220, 221, ... are inputted via the interface 403 (Step S406) and are stored in the common memory 424 (Step S407). All data stored in the second memory 422 through the common memory 424 are the bit map data, and the logical operation of these stored data is performed via the CPU 401 (Step S410), the data which are so logically operated as to synthesize, edit or image-process pictures, documents or the like are stored in the first memory 421 (Step S411). After the data have been stored in the first memory, judgement of whether the editing work is to be completed or not, in other words, whether or not there will be further additions or modifications to be made, is made (Step S412), and this operation of judgement continues until logical operation of modification or the like has been completed. This logical operational circuit 420 effects in cooperation with the CPU 401 logical operation of the bit map data generated from coded data, i.e. characters or the like, bit map data obtained by expanding the compressed image data and the "sum", "product", "difference", "exclusive or" and the like of the bit maps, and generates image information to be outputted via the output unit 10 of the laser beam printer 11. Address data of the area to be outputted the images are stored at the output-present-area address memory 436B in the output control circuit 436.

The CPU 401 is designed to input information regarding the layout indication from the hard discs 220, 221, . . . , and to pass information regarding setting the transfer area to the second memory 422 through the common memory 424 as well as to transmit timing signals to the raster image converter 431 and the expander 440.

Figure 24:
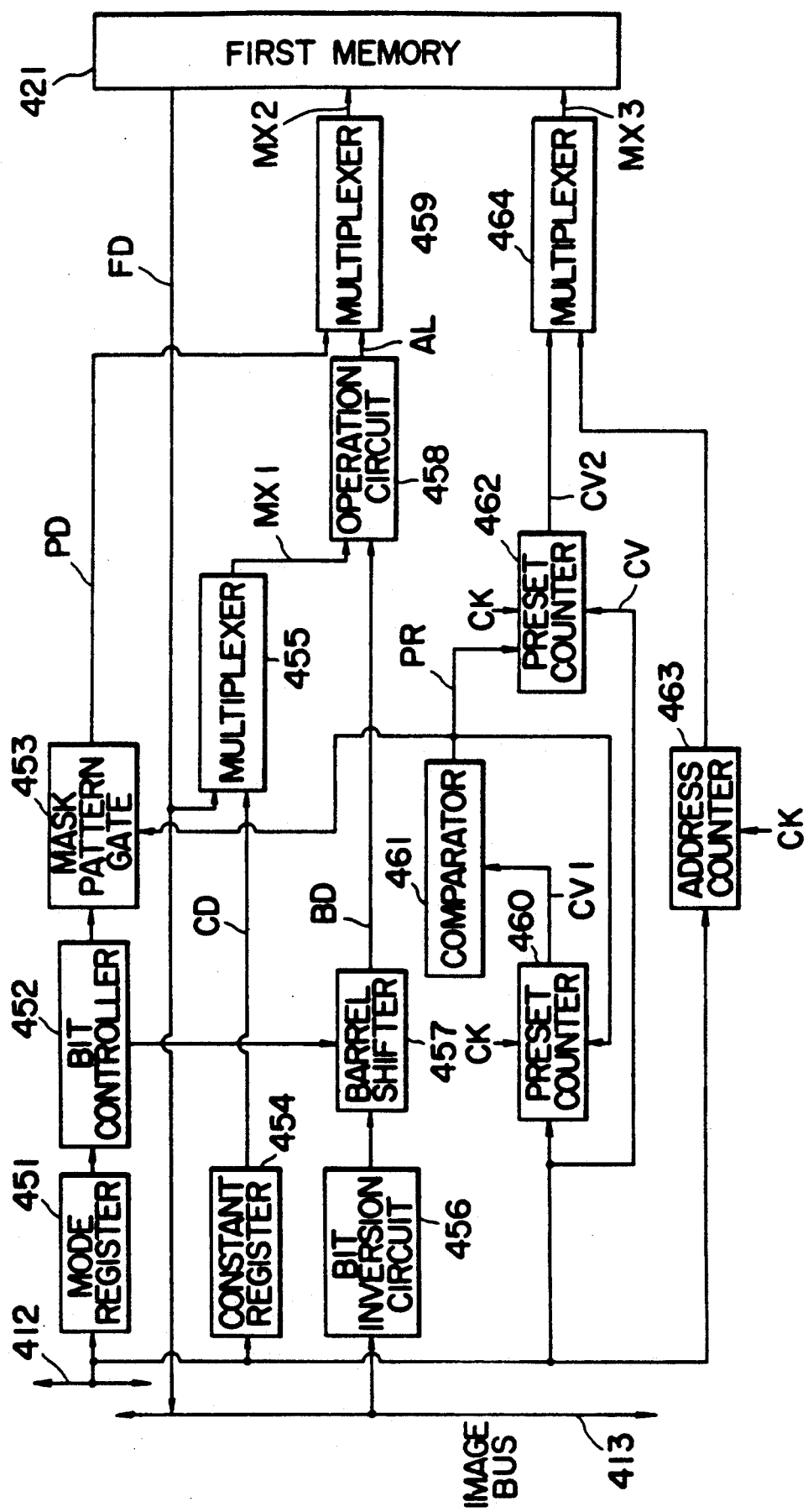
FIG. 24 is a block diagram showing in detail the configuration of the output portion of the image setter.

FIG. 24 shows in more detail the circuit configuration of the logical operational circuit 420, and an example of the operation thereof will be explained with reference to FIG. 25.

Figure 26:
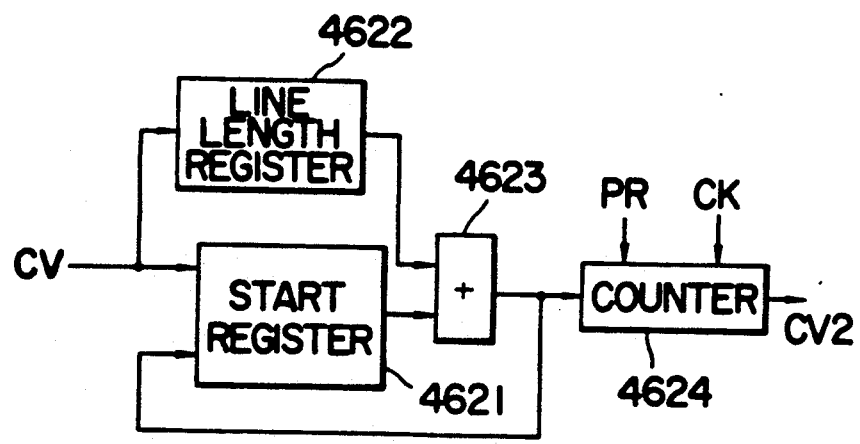
FIG. 26 is a diagram showing in detail the circuit configuration of the preset counter.

The data transferred via the CPU bus 412 are inputted into a mode register 451, a constant register 454, preset counters 460 and 462 and an address counter 463. The output from the mode register 451 is inputted into a bit controller 452, which is designed to enable a barrel shifter 457 for performing high-speed shift. The output from the address counter 463 in inputted into a multiplexer 464. In addition, the output from the bit controller 452 is inputted into a mask pattern gate 453 for outputting regular-shaped data, and the output from the mask pattern gate 453 is inputted into a multiplexer 459 as well as a comparater 461. The constant data from the constant register 454 is inputted into a multiplexer 455. The data FD read out of the first memory 421 is transferred to an operation bus as well as the multiplexer 455, and the output MX1 from the multiplexer 455 is, together with the output data BD from the barrel shifter 457, inputted into an operation circuit 458. The operated output AL from the operation circuit 458 is inputted into the multiplexer 459, and the output MX2 therefrom is inputted into the first memory 421 to be stored therein. When it cannot complete data to a word unit, the multiplexer 459 writes them and uses bits needed to effect writing after generating bit patterns by means of mask patterns. The data transferred from the image bus 413 is inputted into the barrel shifter 457 after the LSB and MSB thereof are inverted at a bit inversion circuit 456 depending upon necessity (for instance, in the case of an inverted display due to multiplication), and the output MX3 from the multiplexer 464 is inputted into the first memory 421 as an address command and is stored therein. The preset counters 460 and 462 count the clock pulse CK and are designed to cause the comparator 461 to output a count-preset-enable signal PR when the preset counter 460 counts up to a given value (for instance, the preset value or "0"), the count-preset-enable signal being already in the preset counters 460 and 462. As shown in detail in FIG. 26, the preset counter 462 comprises a start register 4621, a line length register 4622 for setting line length data, an adder 4623 for adding the respective values of the start register 4621 and the line length register 4622, and a counter 4624. Access to the memory is normally effected every 16 bits as a unit. However, since the present invention uses the bit map data, if data are written every 16 bits, the data will be written at improper bit positions. In addition, in a case where the address position of a source is different from that of a destination, it is impossible to write data at proper positions unless bit positions are shifted. The barrel shifter 457 is used for this purpose.

Figure 28:
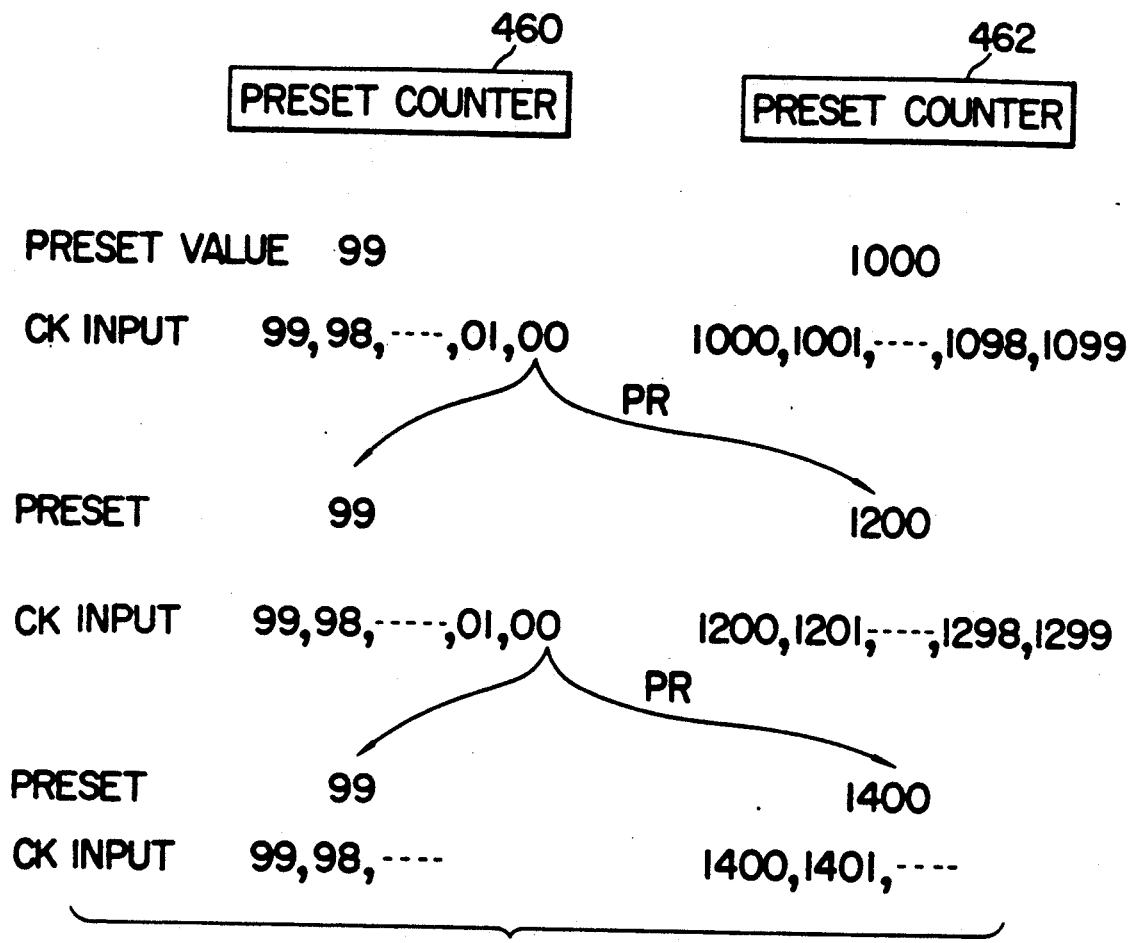
Figure 29:
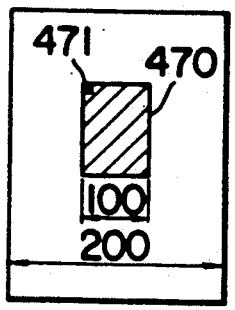

In this configuration, storing data in the first memory 421 is effected by storing the results of operation in a designated address using the output MX3 from the multiplexer 464 as address data. The preset data from the CPU bus 412 are inputted into the preset counters 460 and 462, and in a case where the relationship between the output line and effective data resembles one shown in FIG. 27D, the preset counters 460 and 462 are, as shown in FIG. 28, preset at "99" and "1000", respectively. The preset counter 460 counts the clock pulse CK in a count-down manner, while the preset counter 462 counts the clock pulse CK in a count-up manner. When the preset counter 460 counts to "0", the comparator 461 is designed to output a count-up signal CR, and the preset counter 460 is preset again at "99", while the preset counter 462 is preset at "1200", similar operations being repeated thereafter. In other words, when an image shown as an area 470 in FIG. 29 is written in the first memory 421, the start register 4621 is first initialized at "−200 which is the value indicating the data position of a point 471", with the line length register 4622 being set at "200". The preset counter 460 is preset at "100", and the preset counter 462 is preset at "1400", and the clock pulse CK is inputted. When the clock pulse CK is counted up to "100", the comparator 461 outputs the count-up signal CR, and the counter 4624 is set at the value representing the point 471, in other words, at "+200" which represents the head address one line before. The clock pulse CK is inputted, and operations similar to this are repeated thereafter. The output from the preset counter 462 is selected by the multiplexer 464 and is inputted into the first memory 421 as the address data MX3. The data FD read out of the first memory 421 by means of this address are inputted into the multiplexer 455, and the multiplexer 455 outputs either the data FD or the constant data CD from the constant register 454. The output MX1 from the multiplexer 455 is inputted into the operation circuit 458. The data transferred from the operation bus via the bit inversion circuit 456 and the barrel shifter 457 are already in this operation circuit 458, and the operated data AL of the operation circuit 458 are inputted into the multiplexer 459. The pattern data PD from the mask pattern gate 453 are already in the multiplexer 459, and either of these data are selected for output therefrom as the output data MX2, which are stored in the first memory 421. This type of operation of data and storage of data in the first memory is effected word by word. In addition, in a case where the data is read out of the first memory 421, the initial value passed from the CPU bus 412 every line is set in the address counter 463, and address renewal is effected by means of a clock, and the output values are selected by the multiplexer 464 for effecting addressing. The data designated by the address of the output MX3 from the multiplexer 464 are read out of the first memory 421 for transfer to the operation bus.

First, the sequencer 410 is set at the address to be read out of the first memory 421 after viewing the information (this information is created by the CPU 401 and is passed in advance to the output control circuit 436 via the CPU bus 412 to be stored therein) of an output-present-area address memory 436B in the output control circuit 436 (Step S420) and is then enabled for reading-out operation for the sequencer 410 (Step S421). Subsequently, the data on the relevant line is stored in the input buffer 435 of the output portion (Step S422), and judgement is made as to whether or not the address information belonging to other output areas is present on the same line (Step S423). In the event that the address information belonging to other output areas is not present in the same line, a line data generation circuit inside the output control circuit 436 is enabled to input into the output buffer 436A the output data corresponding to the quantity of one line (Step S424), this operation being repeated until processing of the last of the lines is completed. Each unit of the image setter 400 is started in a parallel or sequential manner by means of the CPU 401, and this results in the fact that access to the first memory 421, output of data from the output control circuit 436, conversion of raster images and the like are effected in a time-sharing manner. The output-preset-area memory only stores data like one representing the area 470 shown in FIG. 29, and a blank area surrounding such an image area acts as a white or black area for interpolating the data.

FIG. 27A shows a document containing information equivalent in quantity to that to be outputted as one page. FIG. 27B shows bit map data needed to output the information shown in FIG. 27A, wherein the respective rectangles represent bit map data secured in the memory area (the first memory 421). A bit map corresponding to one rectangle corresponds to the continuous memory area, but no relationship in terms of memory is present in the portions of the memory area which correspond to gaps formed between the respective rectangles. FIG. 27C shows the bit map area in FIG. 27B which is separated (block separation) in the transverse direction (main scanning direction) in order to produce the output-present-area address, and this causes all lines in one block to have the same effective data position and length. In the case of FIG. 27C, blocks are divided such as BL1-BL10 along the main scanning direction X, and further areas presented images (pictures) and spaces are divided such as sub-blocks SB1-SB21 in an auxiliary direction Y. According to this invention, document information for each one page is controlled by the blocks BL1-BL10 and the sub-blocks SB1-SB21 in accordance with a reference point RP. Therefore, data transferring command in FIG. 27C is illustrated as shown in FIG. 30 and commands for the whole page are stored at headers of the output page as shown in FIG. 31. Name of the output unit is an information which indicates the high quality image output unit 10 or the laser beam printer 11 and block start offset address indicates a head address of the block data when the header of the output page is head. Reference number of image number means the reference number in a case that the same image in one page is referred at a plurality of numbers, and commands corresponding to the blocks BL1-BL10 are stored in the block headers #1-#10 and the commands include the scanning width Y of the blocks BL1-BL10 and the number of the sub-blocks. Further, commands corresponding to the sub-blocks SB1-SB21 are respectively stored in sub-block data SD1-SD21 and the commands include the scanning width X, the image number, the sub-block address on the memory and the sub-block attribute. The sub-block attribute means the attribute data such as bit number of the pixel and positive/negative image. FIG. 27D shows, respectively, portions necessary (effective data) and portion unnecessary (white data) to be read out of the first memory 421 by means of the sequencer 410 when the output data corresponding to a quantity of one line is inputted into the output buffer 436A in the output control circuit 436 or is directly outputted therefrom. In the portions corresponding to the oblique line-given portions, the data are read out of the first memory 421.

With the image processing system according to this invention, since respective image data which constitute one page are separated from data commands, it is possible to reduce the capacity for storing data. Since the system separates and controls the commands of a unit of one page as well as the commands of the blocks and the sub-blocks, it is possible to perform different processes for respective images and the process of the whole system becomes easy. Further, since the image data can be transferred without load of the CPU if editing command is in advance given to DMA, it is possible to process at a high speed and it is not necessary to have non-image portions in the memory. Still further, according to this invention, since the same image can be referred a plurality of times, it is possible to process a large quantity data and to handle high quality images.

With the image generating apparatus according to this invention, it is possible to edit and process a large quantity image data of characters and pictures at a high speed and to output high quality images for printing of the form indicated by layout. The apparatus can realize the reduction of the memory capacity in accordance with the data compression/expansion and the same of data transferring time, and it is possible to easily make bit maps of vector information by the hardware and further to easily image-processes, manufactures and edits. Since the apparatus can output by layouting the characters abd the pictures and further separates the image data and the transferring commands, it is possible to reduce the capacity of the memory, the shorten the working time and to greatly reduce the loss of the photosensitive material. Further, since the apparatus according to this invention can bit-map develop or over-lap-process a large quantity image data at a high speed only just before when the data is outputted, it is possible to greatly reduce the memory areas for storing the image data.

What is claimed is:

1. An image generating apparatus to lay-out and output to a display and a printer, scanned in a main direction and an auxiliary direction, character images via code data and bit map images formed by either one of compressed data or non-compressed data, which comprises:
a first memory for storing bit mapped image data, addressable in block form, for outputting to said display and said printer,
a raster image converter for converting said code data into bit map data,
a second memory for temporarily storing bit map data which was converted by said raster image converter,
an expander for converting said compressed data into bit map data by expanding said compressed data,
a third memory for temporarily storing bit map data which was converted by said expander,
a fourth memory for temporarily storing non-compressed bit map data,
a transferring means for transferring bit map data in parallel from said second, third and fourth memories to a designated area of said first memory, said designated area containing displayable information and printer information in block form;
a logical operational means for performing selectable ones of a plurality of logical operations for each bit of said transferred data and correspondingly located bits of said stored data of said first memory, as said data is transferred to said first memory said operations comprising at least one of overlapping bit map data and synthesizing bit map data, and
a sequencer for controlling said transferring means and logical operational means to operate in a predetermined order.

2. An image generating apparatus as claimed in claim 1 wherein said transferring and logical operational means are connected via bus lines and further includes an output unit for recording images.

3. An image generating apparatus as claimed in claim 1 wherein said logical operational means comprises:
a mode register and a constant register connected to a first bus line carrying command and address information, said registers being operative for receiving and storing choice of mode information and predetermined display information, respectively,
a bit inversion circuit connected to a second bus line carrying image data for inverting selected bits of said image data and outputting inverted bit image data,
a bit controller operated in accordance with the content of said mode register for outputting control signals for each choice of mode;
a barrel shifter for shifting inverted bit image data output from said bit inversion circuit under control of said bit controller,
a mask pattern gate for outputting fixing image data defining a mask pattern for display,
a first multiplexer for inputting bit mapped image data read out from said first memory and predetermined display information output from said constant register,
an operation circuit which receives an output of said barrel shifter and an output of said first multiplexer and then operates in logic to output logic processed image data,
a second multiplexer which receives logic processed image data output from said operation circuit and fixed image data output from said mask pattern gate and transfers a selected data to said first memory, a first preset counter and an address counter connected to said first bus line and operative to receive clock pulses,
a comparator which compares the counted value of said clock pluses in said first preset counter with a set value,
a second preset counter which counts said clock pulses as a preset value being output of said comparator, and
a third multiplexer which inputs counted values of said address counter and said second preset counter and then transfers a selected value to said first memory.

4. An image output command method in an image processing system operative to edit and combine density data, structured data, and image data into displayable information in page format, said displayable information comprising a quantity of displayable information to be displayed at one time on said image output unit, said system comprising:
an input unit for inputting an image and converting said image into density data, said density data comprising data in a format manipulable by said image processing system;
an input controller comprising a buffer and a first CPU for storing in said buffer said density data from said input unit in a compressed format;
a work station, comprising an editing input unit for inputting structured data, an input operating means for inputting image data, and a second CPU, operational to edit said inputted structured data and image data;
a file server, comprising a third CPU and a memory means, and being connected to said input controller and said work station, said file server being operative to store said image data, said structured data, and said density data; and
an image setter means, comprising an attached image output unit operative to scan in a main scanning direction and in an auxiliary scanning direction, transverse to said main scanning direction, and a fourth CPU, for receiving said image data, structured data and density data stored in said file server, converting said image data, structured data and density data into displayable format data, and outputting said displayable format data via said attached image output unit;
said image output command method comprising the steps of:
(1) reading out selected ones of said stored image data, structured data and density data from said file server;
(2) grouping said read out data according to corresponding pages of displayable information in which images formed from said read out data will be diplayed;
(3) grouping, by page, commands that control the processing of said read out data for output via said image setter;
(4) separating said data to be diplayed per page into blocks and sub-blocks in order to control the positioning of said images to be outputted as displayable format data to said image output unit; and
(5) providing separately in said command groupings, commands for displaying the selected read out data in said separate blocks and sub-blocks.

5. An image output command method as claimed in claim 4 wherein said blocks are established by dividing a page along a direction parallel to said direction of main scanning performed by said image output unit and said sub-blocks are established by dividing a page along a direction parallel to said direction of auxiliary scanning performed by said image output unit.

6. An image output command method as claimed in claim 5 wherein said blocks sharing a common page are designated by a common reference address.

7. An image output command method as claimed in claim 6 wherein said blocks comprise an output page header, block headers and sub-blocks which respectively correspond to said block headers.

8. An image output command method as claimed in claim 7 wherein said output page header contains a byte size of said output page, a designation output page number, a name of said image output unit, a page number, reference point coordinates, page sizes, a whole block number, a start offset address of block and reference numbers of respective images.

9. An image output command method as claimed in claim 7 wherein said sub-blocks data include scanning widths, an image number, a sub-block address in a memory and sub-block attributes.

* * * * *